United States Patent
Chien et al.

(10) Patent No.: US 6,707,977 B2
(45) Date of Patent: Mar. 16, 2004

(54) ALL FIBER POLARIZATION MODE DISPERSION COMPENSATOR

(75) Inventors: Ching-Kee Chien, Horseheads, NY (US); Michelle D Fabian, Horseheads, NY (US); Gregory F Jacobs, Elmira, NY (US); Edward F Murphy, Painted Post, NY (US); Huan-Hung Sheng, Horseheads, NY (US); Lung-Ming Wu, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/056,961

(22) Filed: Jan. 25, 2002

(65) Prior Publication Data

US 2002/0168165 A1 Nov. 14, 2002

Related U.S. Application Data

(60) Provisional application No. 60/276,809, filed on Mar. 15, 2001.

(51) Int. Cl.$^7$ ................................................. G02B 6/27
(52) U.S. Cl. ........................................ 385/128; 385/11
(58) Field of Search ............................ 385/11, 123, 127, 385/128

(56) References Cited

U.S. PATENT DOCUMENTS

| | | | |
|---|---|---|---|
| 4,923,290 A | * 5/1990 | Brinkmeyer et al. | 359/245 |
| 4,962,992 A | 10/1990 | Chapin et al. | |
| 4,988,169 A | * 1/1991 | Walker | 359/256 |
| 5,891,930 A | * 4/1999 | Lapin et al. | 522/31 |
| 5,903,684 A | * 5/1999 | Payton | 385/11 |
| 5,930,414 A | * 7/1999 | Fishman et al. | 385/11 |
| 6,057,034 A | * 5/2000 | Yamazaki et al. | 428/378 |
| 6,385,357 B1 | * 5/2002 | Jopson et al. | 385/11 |
| 6,534,557 B2 | * 3/2003 | Szum et al. | 522/90 |
| 2001/0008906 A1 | * 7/2001 | Chawla | 522/90 |
| 2001/0025062 A1 | * 9/2001 | Szum et al. | 522/96 |

FOREIGN PATENT DOCUMENTS

| | | | |
|---|---|---|---|
| EP | 0311186 | 4/1989 | |
| EP | 1 132 759 A1 | 9/2001 | ............ G02B/6/44 |
| GB | 2184252 A | 6/1987 | |
| WO | WO99/53363 | 10/1999 | |

OTHER PUBLICATIONS

Sandel et al., "Automatic Polarisation Mode Dispersion Compensation in 40 Gbit/s Optical Transmission System", Electronics Letters, Nov. 12$^{th}$, 1998, vol. 34, No. 23.

* cited by examiner

Primary Examiner—Hemang Sanghavi
Assistant Examiner—Scott A. Knauss
(74) Attorney, Agent, or Firm—James V. Suggs; Svetlana Z. Short

(57) ABSTRACT

A polarization mode dispersion compensator corrects polarization mode dispersion in an optical signal having a fast polarization mode component, a slow polarization mode component and a time differential between the components. The compensator includes a phase shifter and a variable delay section. An input of the phase shifter is coupled to an optical device that provides an optical signal that exhibits polarization mode dispersion. The phase shifter functions to rotate the optical signal principal states of polarization to a desired orientation. The phase shifter engages a segment of an optical fiber that is coated with a radiation cured coatings. The coating composition is selected so that in response to a preload comprising the application of a stress of about 80 MPa to said coating at about 80° C. and after a stress-relaxation period of at least about 1 hour, at about 80° C., a residual stress exhibited by said coating comprises at least about 60 MPa, and the coating is capable of transmitting a transverse stress to the fiber to controllably change the birefringence of the fiber.

26 Claims, 13 Drawing Sheets

Rod DMA: tan delta
(Tg as Shown)

Rod DMA: Elastic Modulus

ALL FIBER POLARIZATION MODE DISPERSION COMPENSATOR

CROSS-REFERENCE TO RELATED APPLICATIONS

This application claims the benefit of U.S. Provisional Application Ser. No. 60/276,809, filed Mar. 15, 2001 entitled ALL FIBER POLARIZATION MODE DISPERSION COMPENSATOR, by Chin Ching-Kee, Michelle Fabian, Gregory Jacobs, Edward Murphy, Huan-Hung Sheng, and Lung-Ming Wu.

BACKGROUND OF THE INVENTION

1. Field of the Invention

The present invention is generally directed to an optical fiber, and more particularly to a polarization mode dispersion (PMD) compensator for a single-mode optical fiber.

2. Technical Background

Polarization mode dispersion (PMD) in single-mode optical fibers is a recognized source of bit errors in high-speed optical communication systems. PMD may cause optical pulse broadening, or pulse deformation in general, and as such, limit the bit rate that can be achieved with a given optical communication system that does not compensate for the PMD. As pulses broaden, eventually the individual bits are no longer distinguishable and the communication system ceases to properly function.

PMD in single-mode optical fibers has been explained through a model which divides a given light pulse into a signal with two principal states of polarization (PSP). The pulse broadening of a transferred optical signal, induced by first-order PMD, is caused by the propagation time difference between the input pulses projected onto each of the two orthogonal polarization axes (i.e., the PSP) in a single span of single-mode optical fiber or onto the PSP of interconnected single-mode optical fibers. The propagation time difference, known as differential group delay (DGD), is usually expressed in units of picoseconds per square root kilometer for single spans of single-mode optical fiber and for interconnected single-mode optical fibers.

As is well known to one of ordinary skill in the art, first-order PMD is typically caused by a characteristic of optical fibers known as birefringence. Birefringence occurs when an optical fiber has different indices of refraction, with respect to a set of axes defined within the fiber. For example, when light travels along the length of the fiber (e.g., along the Z axis of a Cartesian coordinate system), the two principal states of polarization are orthogonal to each other and to the length of the fiber (e.g., projected along the X and Y axes). The indices of refraction measured with respect to the X and Y axes typically exhibit slight differences due to the geometrical properties of the fiber and/or environmental effects.

Many geometrical deviations of an optical fiber can be attributed to the optical fiber manufacturing process, which typically yields fibers that are not perfectly round. Environmental effects, such as applied stress, can alter the index of refraction in the region of the stress and cause the birefringence of the fiber to change. The change in birefringence with the application of stress has been extensively studied in the field of stress optics. When the amount of stress, the type of stress and the stress properties of a given optical fiber are known, the amount of change in birefringence can generally be accurately calculated. The fiber axis with the higher index of refraction is known as the 'slow axis'. The fiber axis with the lower index of refraction is known as the 'fast axis'. The terms 'fast axis' and 'slow axis' refer to the relative speed of light propagation along the orthogonal axes. As is well known to one of ordinary skill in the art, a change in birefringence, as a function of applied stress, is typically greatest when the stress is applied transverse to either the fast or slow axis of an optical fiber.

Several techniques for changing the birefringence of an optical fiber are known. For example, the birefringence of an optical fiber can be changed by applying an axial strain (pulling) or applying a transverse stress to the fiber, with a piezoelectric actuator or an electromagnetic fiber squeezer. However, pulling on a fiber is subject to mechanical limitations that include breakage and coating delamination and therefore is somewhat less desirable than applying a transverse stress. As compared to a piezoelectric actuator, a typical electromagnetic fiber squeezer is slow, uses more power and is noisier (i.e., is a noise source in the electromagnetic spectrum).

A variety of arrangements have been proposed as potential PMD compensators for optical fibers. The different PMD compensators can generally be classified according to how polarization transformation and compensation is accomplished. For example, polarization transformation has been achieved by mechanical rotating elements, liquid crystals and fiber squeezers. As is well known to one of ordinary skill in the art, squeezing an optical fiber induces a stress birefringence, which can be utilized to control polarization. Current PMD compensator designs utilize optical or optoelectronic birefringent elements that permit the delay of one polarization state with respect to the other. While certain experimental PMD compensators have been demonstrated, no practical PMD compensators, which adequately compensate for first-order PMD in optical fibers, are commercially available.

As such, a practical device which compensates for first-order polarization mode dispersion in a single-mode optical fiber, is desirable.

SUMMARY OF THE INVENTION

The present invention is directed to a polarization mode dispersion compensator for correcting polarization mode dispersion in an optical signal having a fast polarization mode component, a slow polarization mode component and a time differential between the components. The compensator includes a phase shifter and a variable delay section. An input of the phase shifter is coupled to an optical device that provides an optical signal that exhibits polarization mode dispersion. The phase shifter functions to rotate the optical signal principal states of polarization to a desired orientation. The variable delay section includes an input, an output and at least one optical fiber delay line. The input of the variable delay section is coupled to the output of the phase shifter and the desired orientation of the optical signal principal states of polarization are substantially rotated to be in alignment with one of a fast axis and a slow axis of each of the one or more fiber delay lines. In this manner, the variable delay section functions to delay the principal states of polarization of the optical signal with respect to one another as a function of whether the principal states of polarization traverse said one of a fast and a slow axis of a given optical fiber delay line, thus reducing the time differential between them.

The invention also includes an inventive coating for optical fiber that is included in the polarization mode dispersion compensator. The inventive coating is preferably a radiation cured coating which is applied to at least a segment of an outer surface of the fiber. Preferably, the inventive coating composition is selected so that in response to a preload comprising the application of a stress of about 80 MPa to the coating at about 80° C. and after a stress-relaxation period of at least about 1 hour, at about 80° C., a residual stress exhibited by the coating comprises at least about 60 MPa.

Advantages of the inventive coating include the ability to substantially transmit a lateral stress applied to the coating to a glass fiber, the coating is substantially elastic, and will substantially maintain the transmission of the stress to a fiber over time. Preferably, the stress transmitted will not undergo substantial decay as a function of time. The advantages of the coating also include that the coating has the ability to transmit a transverse stress to the fiber to controllably change the birefringence of the fiber. The advantages further include that the coating has the ability to maintain the stress after a creep period. In practice the "creep period" is the time during which the actual build-up of the device takes place, where the static load is manually applied to the coated fiber via the squeezer plates and the set-screw to achieve the desired optical output.

In an optional embodiment, the inventive coating comprises about 0–90 weight percent of an oligomeric component and about 5–97 weight percent of a monomeric component. Preferably, the Young's modulus of the aforementioned embodiment of the coating comprises at least about 100 MPa.

A PMD compensator, according to the present invention, is relatively easy to manufacture and provides a low loss, low cost and highly reliable practical solution to PMD.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENTS

An embodiment of the present invention is generally directed to an all fiber polarization mode dispersion (PMD) compensator that preferably utilizes polarization-maintaining (PM) optical fibers in conjunction with mechanical squeezers (e.g., piezoelectric actuators) to compensate for first-order PMD in single-mode optical fibers. When implemented in conjunction with an appropriate real-time detection and feedback control system (FIG. 4), a PMD compensator, according to the present invention, provides a practical solution to first-order PMD in high-speed optical fiber communication systems. A phase shifter (PS), according to the present invention, can also serve as a polarization scrambler, which is useful for testing optical components to characterize the polarization dependent losses (PDLs) or other polarization dependent effects. One of ordinary skill in the art will appreciate that a polarization scrambler can utilize regular optical fiber or PM optical fiber.

Figure 1:
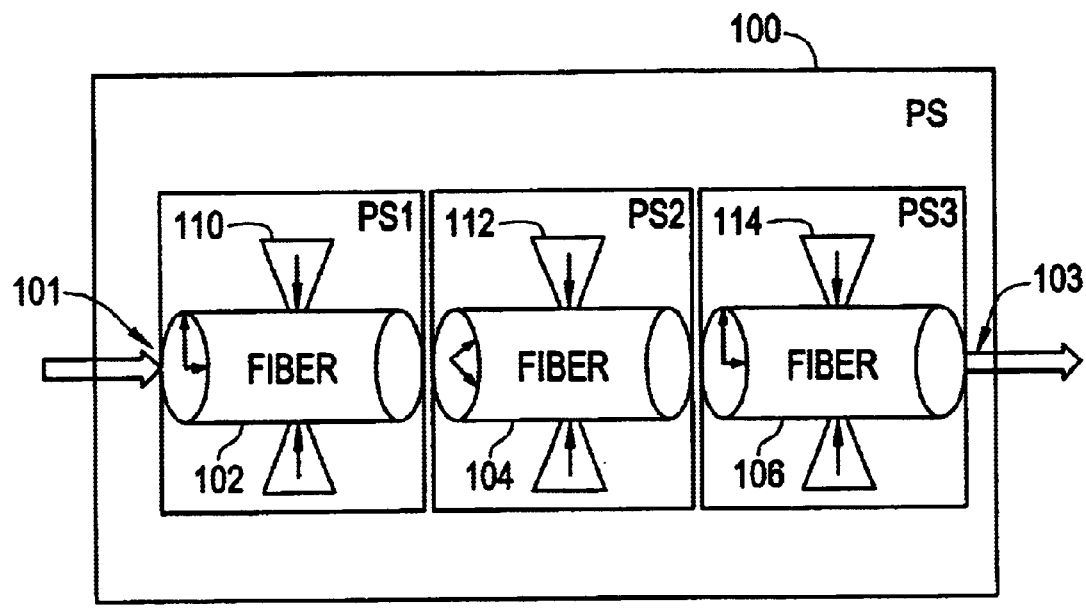
FIG. 1 is a block diagram of a phase shifter (PS) included within a polarization mode dispersion (PMD) compensator, constructed according to an embodiment of the present invention.

As is illustrated in FIG. 1, PS 100 preferably includes three mechanically squeezed PM optical fibers 102, 104 and 106 that are coupled (e.g., fusion spliced using commercially available splicers) in series and acted upon by three mechanical squeezers 110, 112 and 114, respectively. Preferably, mechanical squeezers 110, 112 and 114 are piezoelectric actuators that have a response time typically much less than one millisecond. Before joining the fibers 102, 104 and 106, it is normally desirable to recoat the fibers 102, 104 and 106 with a material (e.g., a metal or polymer) such that the fibers 102, 104 and 106 can withstand the mechanical stress applied to them over the lifetime (e.g., up to twenty years) of the PMD compensator. In a preferred embodiment, fibers 102, 104, and 106 are coated with the inventive coating as described below. The fast axes of each fiber 102, 104 and 106 are mechanically oriented at zero, forty-five and zero degree azimuths, respectively. As used herein, the azimuth is defined as the angle that a fast axis of each fiber 102, 104 and 106 makes with the Y axis, after a mechanical rotation about the Z axis.

In a preferred embodiment, PS 100 includes three PSs: PS1, which includes fiber 102 and mechanical squeezer 110; PS2, which includes fiber 104 and mechanical squeezer 112; and PS3, which includes fiber 106 and mechanical squeezer 114. As previously stated, PS 100 can also function as a polarization scrambler, depending on the particular strategy used to activate mechanical squeezers 110, 112 and 114. One of ordinary skill in the art will appreciate that mechanically aligning PS2 at an angle of forty-five degrees with respect to PS1 provides ninety degrees of light phase difference between PS1 and PS2. Since PS1 and PS2 are orthogonal with respect to a light signal, the combination of PS1 and PS2 can reach any point on a Poincaré sphere. One of ordinary skill in the art will appreciate that if PS1 and PS2 are not mechanically aligned at forty-five degrees, only a subset of polarization states can be reached on a Poincaré sphere. In an alternate embodiment, compensator 100 may include 4 or more PSs.

Figure 2:
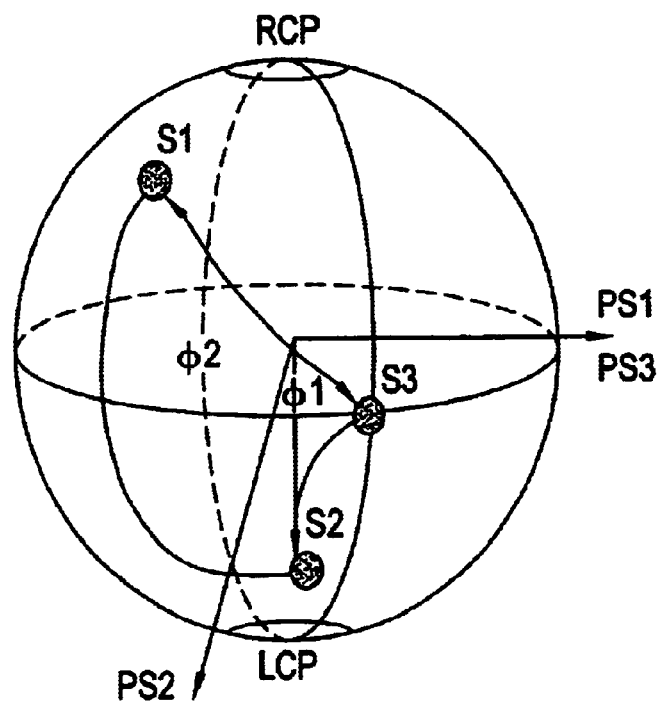
FIG. 2 is a Poincaré sphere illustrating the operation of the PS of FIG. 1.

FIG. 2 shows a Poincaré sphere that optically represents PS1, PS2 and PS3 with axes lying along an equatorial plane of the Poincaré sphere. PS2 is at right angles to PS1 and PS3. The amount of phase retardation between the fast and slow axis of PS1, PS2 and PS3 can be varied between zero degrees and three-hundred sixty degrees on the Poincaré sphere by varying the magnitude of the mechanical stress, applied by an associated mechanical squeezer. One of ordinary skill in the art will appreciate that only PS1 and PS2 are required to reach any point on the Poincaré sphere. However, PS3 can be advantageously utilized to solve various reset problems, typically associated with mechanical squeezer actuator windup and saturation.

The slow principal state of polarization of the optical signal to be PMD compensated, is denoted by polarization state 'S1' on the Poincaré sphere. The arbitrary input state is first rotated by an angle of $\phi 2$ (by PS2), about the PS2 axis, until it reaches state 'S2'. The resultant state 'S2' is then rotated by an angle of $\phi 1$ (by PS1), about the PS1 axis, until it coincides with the vertical state 'S3'. In this manner, an arbitrary input principal state of polarization 'S1' is aligned with the input of variable delay section (VDS) 300. VDS 300, whose fast axis is aligned with the 'S3' state, generates a variable delay between the slow and fast axis, which is approximately equal to the DGD of the input optical signal. In this manner, compensation is achieved by aligning the slow PSP of the input optical signal with the fast axis of one or more of the delay lines (e.g., DL1, DL2 and DL3) of VDS 300 such that the delay provided by VDS 300 substantially matches the PMD delay of an input optical signal.

Figure 3:
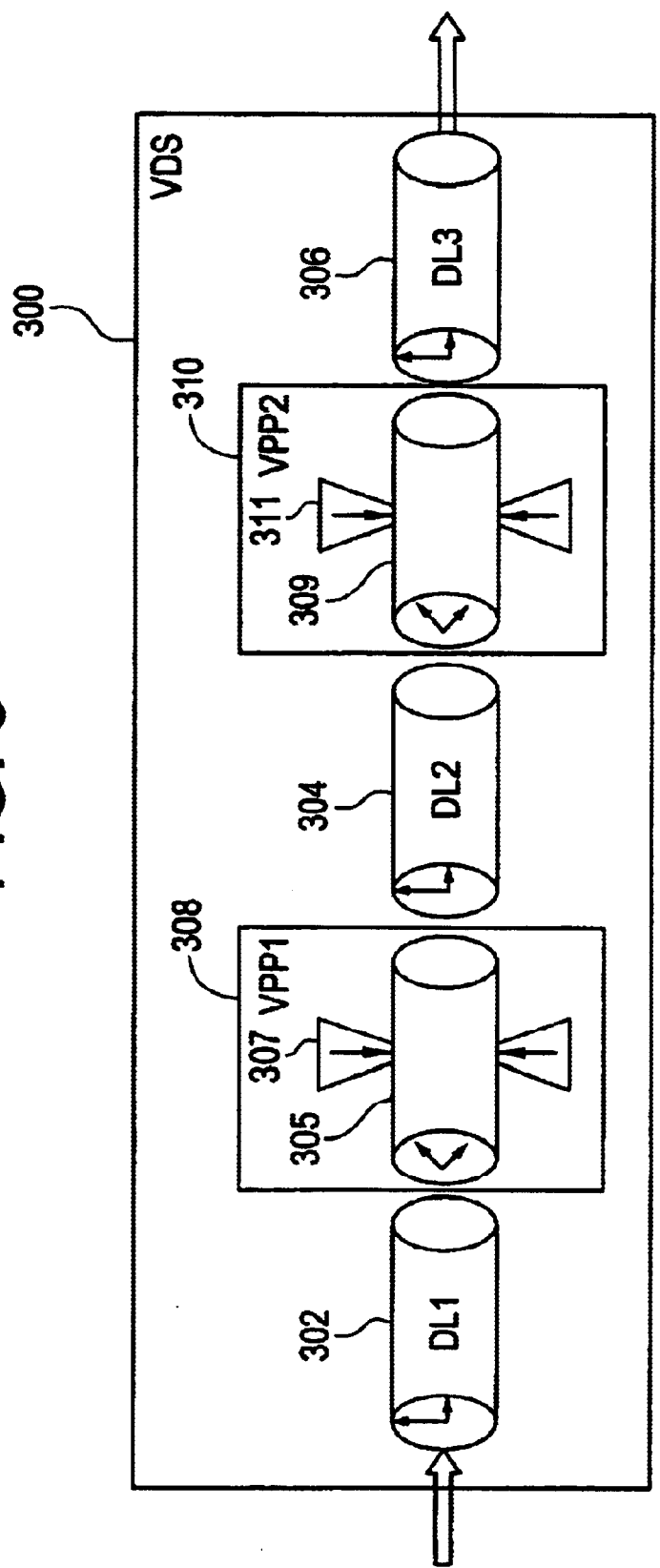
FIG. 3 is a block diagram of a variable delay section (VDS) that includes three delay lines (DL1, DL2 and DL3) and two variable phase plates (VPP1 and VPP2) included within a PMD compensator, constructed according to an embodiment of the present invention.

As shown in FIG. 3, the portion of the PMD compensator 402 (FIG. 4) that allows the polarization states to be adjusted, with respect to one another, is the variable delay section (VDS) 300. A VDS includes one or more sections of polarization-maintaining (PM) optical fiber that serve as a delay line. VDS 300, of FIG. 3, has three delay lines 302, 304 and 306 (DL1, DL2 and DL3) that represent a fixed amount of total delay, which allows VDS 300 to compensate for a maximum amount of differential group delay (DGD) equal to the combination of delay associated with delay lines 302, 304 and 306. Optionally, DL1, DL2, or DL3 may include either PM fiber or single mode optical fiber. One of ordinary skill in the art will appreciate that any combination of delay lines can be utilized to achieve a desired total delay. For example, each delay line could add the same delay or add delays that are multiple of 2N or of some other factor.

Each delay line is joined to another delay line by a short section of PM fiber that is acted upon by a mechanical squeezer. The combination of PM fiber and mechanical squeezer functions as a variable phase plate (VPP). In FIG. 3, delay line 302 is coupled to delay line 304 by VPP 308 (i.e., VPP1) and delay line 304 is joined to delay line 306 by VPP 310 (i.e., VPP2). VPP1 includes a PM optical fiber 305 that is squeezed by a mechanical squeezer 307. VPP2 includes a PM optical fiber 309 that is squeezed by a mechanical squeezer 311. Preferably, mechanical squeezers 307 and 311 are piezoelectric actuators that have a response time typically much less than one millisecond. In a preferred embodiment, fibers 305 and 309 have their polarization axes mechanically oriented to adjacent delay lines by about forty-five degrees. In essence, the VPPs are just PSs whose actuators function to position an incident light signal at a phase angle of zero degrees or one-hundred eighty degrees with respect to an adjacent delay line. When a given actuator is 'off', an associated VPP has a phase angle of zero degrees. When a given actuator is turned 'on', an associated VPP has a phase angle of one-hundred eighty degrees. One of ordinary skill in the art will appreciate that, as operated, each VPP is optically equivalent to a half-wave plate when at the one-hundred eighty degree phase shift position.

The total delay of VDS 300 is varied by switching VPP1 and VPP2 either 'on' or 'off'. In the 'off' position, a given VPP does not rotate the polarization state and the delay of a subsequent delay line is added to that of the preceding one. In the 'on' position, a VPP acts as a horizontal to vertical polarization transformer, by achieving an one-hundred eighty degree phase shift. This causes the delay of the subsequent PM sections to be essentially subtracted from that of the previous section(s). That is, the delay of the subsequent PM sections are added to the other principal state of polarization. In combination with an appropriate real-time detection and control system, the present invention can be used for first-order PMD compensation in optical fiber communication systems that operate at ten gigabytes per second or more.

As discussed above, the delay lines can take on virtually any value. For example, a VDS 300 can include a number of delay lines where each subsequent delay line provides twice the time delay of an immediately prior delay line. A VDS 300 so constructed provides a PMD compensator with a resolution of 'L', a minimum amount of delay of 'L' and adjustable steps of 'L' up to a maximum of $((2N-1)*L)$ units of delay, where 'N' is the number of stages. For example, if 'L' is four picoseconds, five delay sections of L, 2L, 4L, 8L and 16L, provide a delay of four, eight, sixteen, thirty-two and sixty-four picoseconds, which allows for the compensation of up to one-hundred twenty-four picoseconds of DGD.

Figure 4:
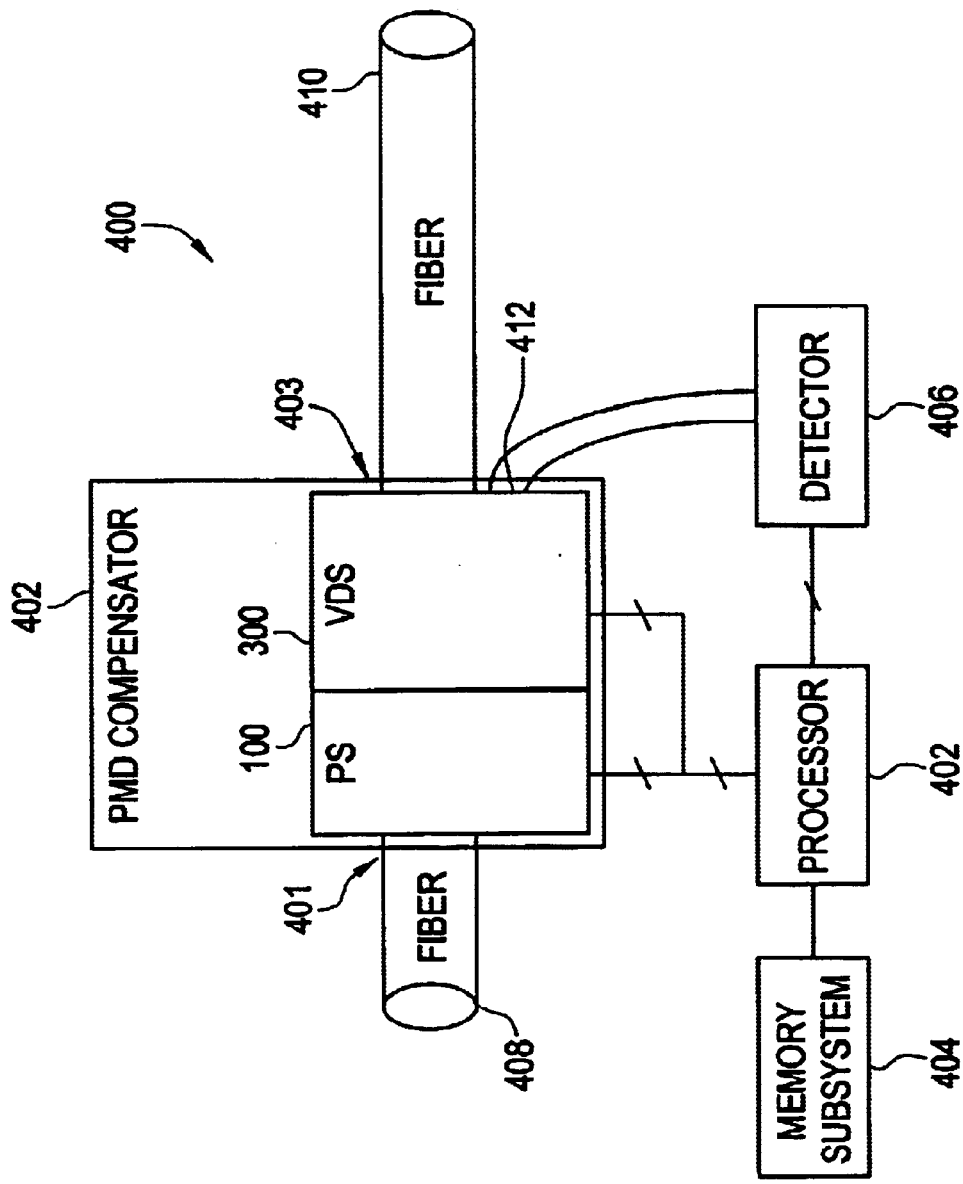
FIG. 4 is a block diagram of a real-time detection and feedback control system incorporating a PMD compensator, configured according to FIGS. 1 and 3.

FIG. 4 depicts a closed-loop feedback control system 400. A PMD compensator 402, according to the present invention, includes a phase shifter (PS) 100 (FIG. 1) that is utilized in conjunction with a variable delay section (VDS) 300 (FIG. 3). PS 100 functions to align the principal states of polarization (PSP) of an input optical signal with the PSP of VDS 300. System 400 includes a processor 402 that is coupled to a memory subsystem 404, a PMD detector 406 and PMD compensator 402. In this context, the term processor may include a general purpose processor, a microcontroller (i.e., an execution unit with memory, etc., integrated within a single integrated circuit) or a digital signal processor.

An optical device 408 (e.g., a single-mode optical fiber) that may experience PMD is coupled to an input 401 of the PMD compensator 402. An output 403 of the PMD compensator 402 provides a compensated optical signal to optical fiber 410. Detector 406 is coupled to the output 403 of the PMD compensator 402, through a tap 412 (e.g., an optical splitter/coupler), such that it receives a portion (e.g., thirty percent) of the compensated optical signal.

Detector 406 functions to reconstruct the power spectrum (i.e., performs an optical autocorrelation function) at selected points (e.g., 2.5 GHz, 5.0 GHz and 7.5 GHz). The outputs at the selected points are low-pass filtered (e.g., using a 300 kHz LP filter) to provide DC voltages. The amount of PMD that the compensated optical signal, exiting the PMD compensator 402, is experiencing can be determined from the DC voltages. The output of the detector 406 is provided to processor 402, which, in response to the output from detector 406, desirably controls compensator 402 (i.e., the piezoelectric actuators of the compensator) to lower the amount of PMD of the compensated optical signal. A suitable PMD detector is described in a note by D. Sandel, M. Yoshida-Dierolf, R. Noé, A. Schöpflin, E. Gottwald and G. Fischer, entitled "Automatic Polarization Mode Dispersion Compensation in 40 Gbit/s Optical Transmission System," Electronics Letters, 1998, Vol. 34, No. 23, pp. 2258–2259, which is hereby incorporated by reference.

Memory subsystem 404 includes an application appropriate amount of volatile and non-volatile memory that contains a software routine for controlling PMD compensator 402, according to the amount of PMD exhibited by the compensated optical signal at the output 403 of the PMD compensator 402. As mentioned above, this is achieved by controlling the mechanical squeezers (e.g., piezoelectric actuators) of PS 100 and VDS 300, according to the software routine stored within memory subsystem 404. Preferably, the piezoelectric actuators have a response time typically much less than one millisecond. Suitable piezoelectric actuators are manufactured and made commercially available by Token Corp. of Japan (part no. ASB090CB01WP1-A1).

In summary, an embodiment of the present invention provides a practical all fiber first-order PMD compensator. The PMD compensator is based on commercially available components, such as, PM fibers and mechanical squeezers (e.g., piezoelectric actuators). The all fiber PMD compensator is relatively insensitive to component misalignment or calibration errors, when the control loop utilizes a feedback configuration. In the preferred embodiment, the present invention advantageously has no rotating parts, which allows the present invention to provide a relatively fast practical solution to first-order PMD, in single-mode optical fibers. A highly reliable PMD compensator can be achieved when the PM fibers of the phase shifters and the variable phase plates utilize durable polymer or metalized optical fiber coatings. In certain implementations, it may be advantageous to embed the PM fibers within a polymer. The high reliability of the PMD compensator is due, in part, to the fact that there are no mechanically rotating elements that require maintenance.

Figure 5:
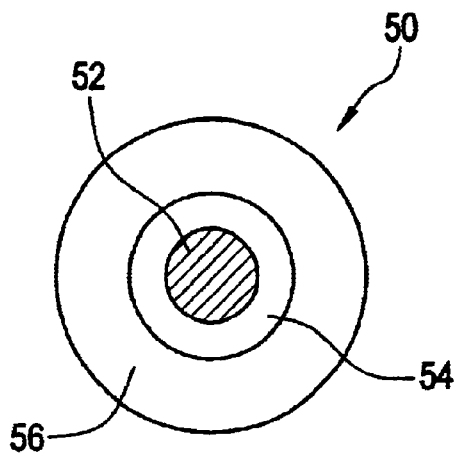
FIG. 5 is a cross sectional view of a coated optical fiber in accordance with the invention.

An optical fiber coated with a suitable polymer is shown in FIG. 5. Preferably, the segment of the fiber which is engaged by the mechanical squeezer is coated with the below described coating. As shown in FIG. 5, coated fiber 50 includes a core 52 surrounded by a cladding 54. The fiber 50 is not limited to any one type of optical fiber. For illustrative purposes, fiber 50 may be a single mode fiber (fiber with a core diameter of about 10 $\mu$m or less), e.g. SMF-28 available from Corning, Incorporated of Corning, N.Y., a multimode fiber (fiber with a core diameter of at least about 50 $\mu$m), a high data rate fiber (fiber having a large effective area, wherein the effective area of the fiber is greater than about 60 $\mu$m2, more preferably the effective area of the fiber is greater than about 65 $\mu$m2, and most preferably the effective area of the fiber is greater than 70 $\mu$m2. It is possible and preferable to have a fiber with an effective area of greater than about 80 to 90 $\mu$m2. The effective area is Aeff=$2\pi(\int E2$ r dr)2/($\int$E4 r dr), where the integration limits are 0 to $\infty$, and E is the electric field associated with light propagated in the waveguide. An effective diameter, Deff, may be defined as, Aeff=$\pi$(Deff/2)2.), e.g. LEAF®, available from Corning, Incorporated, or a polarization maintaining fiber (hereinafter "PM fiber", e.g. Atlas from Corning, Incorporated, Panda from Corning, Incorporated (the specification of U.S. Pat. No. 5,149,349 is incorporated herein by reference) or Bow-Tee from Metrotek Industries, Inc. of St. Petersburg, Fla. Preferably, the PM fiber has a mode-field diameter of no more than about 11.5 $\mu$m, optionally at least about 4.5 $\mu$m. Preferably, the PM fiber exhibits an attenuation of no more than about 3.0 dB/km, more preferably no more than about 1.0 dB/km, and most preferably no more than about 0.5 dB/km. Preferably, the cutoff wavelength exhibited by the PM fiber is no more than about 1450 nm, and optionally at least about 650 nm. Preferably, the maximum beat length of the PM fiber is no more than about 5 mm. Preferably, the maximum cross talk at 100 m is no more than about –25 dB; at 2 m is no more than about –40 dB.

As shown in FIG. 5, a coating 56 is applied to cladding 54 of fiber 50. Coating 56 is typically the cured product of a coating composition that contains urethane acrylate liquids whose molecules become polymerized and cross-linked when cured. Other suitable materials for use in coating 56, as well as considerations related to selection of these materials, are well known in the art and are described in U.S. Pat. Nos. 4,962,992 and 5,104,433 to Chapin, the specifications of which are hereby incorporated by reference. Various additives that enhance one or more properties of the coating can also be present, including the below-mentioned additives incorporated in the compositions of the present invention.

Coating 56 includes preferably at least one UV curable monomeric component and preferably at least one photoinitiator. The monomeric component is preferably present in about 5–97% by weight, more preferably at least about 90%. Coating 56 may also include about 0–90 weight percent of at least one UV curable oligomeric component. In the case that coating 56 is substantially devoid of an oligomeric component, preferably the monomeric component comprises at least about two monomers. In alternate embodiment, coating 56 maybe a thermoset coating resin. Coating 56 is capable of transmitting a transverse stress to the fiber to controllably change the birefringence of fiber 50, unlike conventional dual coating systems that do not transmit the stress to the fiber by forming a cushion for the fiber from such transverse stresses. Also coating 56 does not fatigue like conventional metalized coatings applied to fiber.

It is preferred that coating 56 is not a thermoplastic resin. Preferably, both the monomeric and the oligomeric components are capable of participating in addition polymerization. An example of a suitable monomeric or oligomeric component is an ethylenically unsaturated compound. Ethylenically unsaturated monomeric and oligomeric components may contain various functional groups, which enable their cross-linking. The ethylenically unsaturated monomers are preferably polyfunctional (i.e., each containing two or more functional groups), although monofunctional monomers can also be introduced into the composition. Therefore, the ethylenically unsaturated monomeric and oligomeric components can be a polyfunctional, a monofunctional, and mixtures thereof. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers).

In general, individual monomers capable of at least about 60% conversion, more preferably about 80% or more conversion, (i.e., when cured) are more desirable than those having lower conversion rates. The degree to which monomers having lower conversion rates can be introduced into the composition depends upon the particular requirements (i.e., strength) of the resulting cured product. Typically, higher conversion rates will yield stronger cured products.

Suitable polyfunctional ethylenically unsaturated monomers include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. West Chester, Pa. and Photomer 4025 and Photomer 4028, available from Cognis Corp. (Ambler, Pa.)), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, Cognis Corp., and SR499, Sartomer Company, Inc.), propoxylated trimethylolpropane triacrylate with propoxylation being 3 or greater, preferably ranging from 3 to 30 (e.g., Photomer 4072, Cognis Corp. and SR492, Sartomer), and ditrimethylolpropane tetraacrylate (e.g., Photomer 4355, Cognis Corp. and SR355, Sartomer); alkoxylated glyceryl triacrylates such as propoxylated glyceryl triacrylate with propoxylation being 3 or greater (e.g., Photomer 4096, Cognis Corp. and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), pentaerythritol triacrylate (SR444, Sartomer), and dipentaerythritol pentaacrylate (e.g., Photomer 4399, Cognis Corp., and SR399, Sartomer Company, Inc.); isocyanurate polyacrylates formed by reacting an appropriate functional isocyanurate with an acrylic acid or acryloyl chloride, such as tris-(2-hydroxyethyl)isocyanurate triacrylate (e.g., SR368, Sartomer Company, Inc.) and tris-(2-hydroxyethyl)isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether and the like (e.g., Photomer 3016, Cognis Corp.); and single and multi-ring cyclic aromatic or non-aromatic polyacrylates such as dicyclopentadiene diacrylate and dicyclopentane diacrylate. The monomeric component of coating 56 may contain one or more the aforementioned monomers.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4003, Cognis Corp.); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam; and acid esters such as maleic acid ester and fumaric acid ester. The monomeric component of coating 56 may contain one or more the aforementioned monofunctional ethylenically unsaturated monomers in addition to or in place of the aforementioned polyfunctional ethylenically unsaturated monomers. Preferably, the monomeric component comprises at least one epoxy acrylate containing compound.

Most suitable monomers are either commercially available or readily synthesized using reaction schemes known in the art. For example, most of the above-listed monofunctional monomers can be synthesized by reacting an appropriate alcohol or amine with an acrylic acid or acryloyl chloride.

As indicated above, an optional constituent of the coating composition is the oligomeric component. The oligomeric component can include a single type of oligomer or it can be a combination of two or more oligomers. When employed, if at all, the oligomeric component introduced into the compositions of the present invention preferably comprises ethylenically unsaturated oligomers When employed, suitable oligomers can be either monofunctional oligomers or polyfunctional oligomers, although polyfunctional oligomers are preferred. The oligomeric component can also be a combination of a monofunctional oligomer and a polyfunctional oligomer.

Di-functional oligomers preferably have a structure according to formula (I) below:

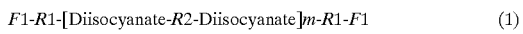

$$F1\text{-}R1\text{-}[\text{Diisocyanate-}R2\text{-Diisocyanate}]m\text{-}R1\text{-}F1 \qquad (1)$$

where F1 is independently a reactive functional group such as acrylate, methacrylate, acrylamide, N-vinyl amide, styrene, vinyl ether, vinyl ester, or other functional group known in the art; R1 includes independently -C2-12O-, -(C2-4-O)n-, -C2-12O-(C2-4-O)n-, -C2-12O-(CO-C2-5O)n-, or -C2-12O-(CO-C2-5NH)n- where n is a whole number from 1 to 30, preferably 1 to 10; R2 is polyether, polyester, polycarbonate, polyamide, polyurethane, polyurea, or combinations thereof; and m is a whole number from 1 to 10, preferably 1 to 5. In the structure of formula I, the diisocyanate group is the reaction product formed following bonding of a diisocyanate to R2 and/or R1.

Other polyfunctional oligomers preferably have a structure according to formula (II) or formula (III) as set forth below:

$$\text{multiisocyanate-}(R2\text{-}R1\text{-}F2)x \qquad (II)$$

or

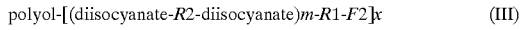

$$\text{polyol-}[(\text{diisocyanate-}R2\text{-diisocyanate})m\text{-}R1\text{-}F2]x \qquad (III)$$

where F2 independently represents from 1 to 3 functional groups such as acrylate, methacrylate, acrylamide, N-vinyl amide, styrene, vinyl ether, vinyl ester, or other functional groups known in the art; R1 can include -C2-12O-, -(C2-4-O)n-, -C2-12O-(C2-4-O)n-, -C2-12O-(CO-C2-5O)n-, or -C2-12O-(CO-C2-5NH)n- where n is a whole number from 1 to 10, preferably 1 to 5; R2 can be polyether, polyester, polycarbonate, polyamide, polyurethane, polyurea or combinations thereof; x is a whole number from 1 to 10, preferably 2 to 5; and m is a whole number from 1 to 10, preferably 1 to 5. In the structure of formula II, the multiisocyanate group is the reaction product formed following bonding of a multiisocyanate to R2. Similarly, the diisocyanate group in the structure of formula III is the reaction product formed following bonding of a diisocyanate to R2 and/or R1.

Urethane oligomers are conventionally provided by reacting an aliphatic diisocyanate with a dihydric polyether or polyester, most typically a polyoxyalkylene glycol such as a polyethylene glycol. Such oligomers typically have between about four to about ten urethane groups and may be of high molecular weight, e.g., 2000–8000. Oligomers having a molecular weight of about to about 15000 may be suitable. However, lower molecular weight oligomers, having molecular weights in the 500–2000 range, may also be used. U.S. Pat. No. 4,608,409 to Coady et al. and U.S. Pat. No. 4,609,718 to Bishop et al., the specifications of which are hereby incorporated by reference to describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from about 2–250 carbon atoms and, preferably, are substantially free of ether or ester groups.

Polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system.

Suitable oligomers include BR301 is an aromatic urethane acrylate oligomer available from Bomar Specialty Co., Photomer 6010 is an aliphatic urethane acrylate oligomer available from Cognis Corp., KWS5021 is an aliphatic urethane acrylate oligomer available from Bomar Specialty Co., RCC12-892 is a multi-functional aliphatic urethane acrylate oligomer available from Cognis Corp., RCC13-572 is an aromatic urethane diacrylate oligomer available from Cognis Corp., and KWS4131 is an aliphatic urethane acrylate oligomer available from Bomar Specialty Co.

Coating 56 may also contain a polymerization initiator which is suitable to cause polymerization (i.e., curing) of the composition after its application to a glass fiber or previously coated glass fiber. Polymerization initiators suitable for use in the compositions of the present invention include thermal initiators, chemical initiators, electron beam initiators, microwave initiators, actinic-radiation initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes about 0.5 to about 10.0 weight percent, more preferably about 1.5 to about 7.5 weight percent.

The photoinitiator, when used in a small but effective amount to promote radiation cure, must provide reasonable cure speed without causing premature gelation of the coating composition. A desirable cure speed is any speed sufficient to cause substantial curing (i.e., greater than about 90%, more preferably 95%) of the coating composition. As measured in a dose versus modulus curve, a cure speed for coating thicknesses of about 25–35 $\mu$m is, e.g., less than 1.0 J/cm2, preferably less than 0.5 J/cm2. It is preferred that the coating composition contains about 10–90% of the monomer; of about 0–90% of the oligomer; and about 0.5–10% of the photoinitiator.

Suitable photoinitiators include, without limitation, 1-hydroxycyclohexylphenyl ketone (e.g., Irgacure 184 available from Ciba Specialty Chemical (Tarrytown, N.Y.)), (2,6-dimethoxybenzoyl)-2,4,4-trimethylpentyl phosphine oxide (e.g., in commercial blends Irgacure 1800, 1850, and 1700, Ciba Specialty Chemical), 2,2-dimethoxyl-2-phenyl acetophenone (e.g., Irgacure 651, Ciba Specialty Chemical), bis(2,4,6-trimethylbenzoyl)phenyl phosphine oxide (e.g., Irgacure 819, Ciba Specialty Chemical), (2,4,6-trimethylbenzoyl)diphenyl phosphine oxide (e.g., in commercial blend Darocur 4265, Ciba Specialty Chemical), 2-hydroxy-2-methyl-1-phenylpropane-1-one (e.g., in commercial blend Darocur 4265, Ciba Specialty Chemical) and combinations thereof. Other photoinitiators are continually being developed and used in coating compositions on glass fibers. Any suitable photoinitiator can be introduced into compositions of the present invention.

In addition to the above-described components, the coating composition of the present invention can optionally include an additive or a combination of additives. Suitable additives include, without limitation, antioxidants, catalysts, lubricants, low molecular weight non-crosslinking resins, adhesion promoters, strength additives, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation).

As used herein, the weight percent of a particular component refers to the amount introduced into the bulk composition excluding the adhesion promoter and other additives. The amount of adhesion promoter and various other additives that are introduced into the bulk composition to produce a composition of the present invention is listed in parts per hundred. For example, an oligomer, monomer, and photoinitiator are combined to form the bulk composition such that the total weight percent of these components equals 100 percent. To this bulk composition, an amount of adhesion promoter, for example 1.0 part per hundred, is introduced in excess of the 100 weight percent of the bulk composition.

A preferred antioxidant is thiodiethylene bis(3,5-di-tert-butyl)-4-hydroxyhydrocinnamate (e.g., Irganox 1035, available from Ciba Specialty Chemical).

The coating composition may also include an adhesion promoter. Examples of suitable compounds include bis(trimethoxysilylethyl)benzene, methacryloxypropyltrimethoxysilane, 3-mercaptopropyltrimethoxy silane, (commercially available from United Chemical Technologies of Bristol, Pa.) and bis(triethoxysilylethyl)benzene. Bis(trimethoxysilylethyl)benzene is commercially available from Gelest (Tellytown, Pa.) and United Chemical Technologies, Inc. Bis(triethoxysilylethyl)benzene can be synthesized from bis(trimethoxysilylethyl)benzene by trans-esterification with ethanol.

Alternatively the adhesion promoter may be an organic compound which includes at least about one thiol functional group, zirconate group, a titanate group or a haloalkylsilane compound.

In the case that the adhesion promoter includes a titanate containing compound, suitable compounds consists of least one of the following group of compounds consisting of tetra (2,2 diallyoxymethyl)butyl, di(ditridecyl)phosphito titanate (commercially available as KR 55, from Kenrich Petrochemcials, Inc. (hereinafter Kenrich) Bayonne, N.J.), neopentyl(diallyl)oxy trineodecanonyl titanate (commercially available as LICA 01 from Kenrich), neopentyl(diallyl)oxy tri(dodecyl)benzene-sulfony titanate (commercially available as LICA 09 from Kenrich), neopentyl(diallyl)oxy tri(dioctyl)phosphato titanate (commercially available as LICA 12 from Kenrich), neopentyl(dially)oxy tri(dioctyl)pyrophosphato titanate (commercially available as LICA 38 from Kenrich), neopentyl(diallyl)oxy tri(N-ethylenediamino)ethyl titanate (commercially available as LICA 44 from Kenrich), neopentyl(diallyl)oxy tri(m-amino)phenyl titanate (commercially available as LICA 97 from Kenrich), neopentyl(diallyl)oxy trihydroxy caproyl titanate (formerly available as LICA 99 from Kenrich), and mixtures thereof.

Preferably, the titanate containing compound contains at least one UV curable functional group. More preferably, the functional group is a (meth)acrylate or acrylate functional group.

In case that the adhesion promoter consists of a zirconate containing compound, preferably the coupling agent consists of at least one ethylenically unsaturated zirconate containing compound, and more preferably at least one neoalkoxy zirconate containing compound. Most preferably, the zirconate containing compound consists of least one of the following group of compounds consisting of tetra (2,2 diallyloxymethyl)butyl di(ditridecyl)phosphito zirconate (commercially available as KZ 55 from Kenrich), neopentyl (diallyl)oxy trineodecanoyl zirconate (commercially available as NZ 01 from Kenrich), neopentyl(diallyl)oxy tri(dodecyl)benzene-sulfony zirconate (commercially available as NZ 09 from Kenrich), neopentyl(diallyl)oxy tri(dioctyl)phosphato zirconate (commercially available as NZ 12 from Kenrich), neopentyl(diallyl)oxy tri(dioctyl) pyrophosphato zirconate (commercially available as NZ 38 from Kenrich), neopentyl(diallyl)oxy tri(N-ethylenediamino)ethyl zirconate (commercially available as NZ 44 from Kenrich), neopentyl(diallyl)oxy tri(m-amino) phenyl zirconate (commercially available as NZ 97 from Kenrich), neopentyl(diallyl)oxy trimethacryl zirconate (commercially available as NZ 33 from Kenrich), neopentyl (diallyl)oxy triacryl zirconate (formerly available as NZ 39 from Kenrich), dineopentyl(diallyl)oxy diparamino benzoyl zirconate (commercially available as NZ 37 from Kenrich), dineopentyl(aiallyl)oxy di(3-mercapto) propionic zirconate (commercially available as NZ 66A from Kenrich), and mixtures thereof.

Preferably, the zirconate containing compound contains at least one UV curable functional group. More preferably, the functional group is a (meth)acrylate or acrylate functional group.

Preferably the adhesion promoter is present in an amount between about 0.1 to about 10 parts per hundred, more preferably between about 0.25 to about 4 parts per hundred, most preferably between about 0.5 to about 3 parts per hundred.

Various additives that enhance one or more properties of the coating can also be present, including the above-mentioned additives incorporated in the compositions of the present invention.

Coating 56, preferably, exhibits a unique viscoelastic property such that it does not stress-relax nor creep significantly with time in the use temperature range. The use temperature range is the range of temperatures that the device will be exposed to when the device is employed in the field. As one skilled in the art will note, polymeric materials may be viscoelastic in that, when subject to a constant strain, the resulting stress will decrease (i.e., relax) with time. Likewise, when subject to a constant stress, the resulting strain will increase (creep) with time. The relaxation and creep rates are dependent on factors such as the chemical composition, the crosslinking density, the degree of cure, the glass transition, the decrease of elastic modulus across the glass transition region, and the use temperature in relationship to its glass transition temperature. The present squeezer design is one of controlled strain which induces stress in the coating, which in turn is transmitted to the glass fiber. The coating shall exhibit a minimal stress relaxation, after a creep period where a preload is applied to the coating during build-up of the device. In the present design, it is preferable that the remaining stress after 20 years at 50° C. is no less than 75% of the initial value, preferably at least 80% of the initial value, more preferably at least 90% of the initial value, even more preferably at least 95% of the initial value, and most preferably at least 99% of the initial value.

There are at least three ways of characterizing the rate of stress relaxation of a polymer. The first is actually measuring the stress decay under a constant strain for the duration, and at the temperature, of the application, i.e., 20 years at 50° C.

The second is measuring viscoelasticity dynamically in the linear strain region (typically less than 1%) and modeling stress-relaxation from the dynamic data. As one skilled in the art will note, elastic modulus (E') and viscous modulus (E") of a polymeric material can be obtained as functions of temperature and time by imposing a sinusoidal strain (or stress) on the sample while the responding stress (or strain) is measured. This is known as Dynamic Mechanical Analysis, or DMA. As the polymer is deformed, part of the strain is recovered after the stress is removed. The phase lag between stress and strain, δ, is directly measured. The tangent of this phase lag between stress and strain, δ, is tan δ. The temperature at which tan δ peaks is conventionally defined as the glass transition temperature, Tg. Since tan δ is the ratio of E" to E', both E" and E' are readily derived from the composite stress response (E*) and tan δ measured. An experimentation of frequency-temperature multiplexing is done to obtain all viscoelastic parameters as functions of time and temperature. By horizontally shifting multiple curves of parameter-versus-log time of different temperatures, the time scale is effectively extended logarithmically. This is known as the Time-Temperature Superposition Principle. The extended time curves are conventionally referred to as Master Curves of E', E", and tan δ. The shifting factors with respect to temperature follow a universal expression known as the WLF equation (Williams, Landel, and Ferry, 1955). For most polymeric materials, a general tendency of time-temperature equivalence is known to be about 7–10° C. per decade of time. The time-temperature relationship, WLF equation, is useful in projecting long-term behavior from short-term experimental response at elevated temperatures. The elastic modulus and the viscous modulus in the dynamic mode can be further converted to stress-relaxation modulus, E(t), for the transient behavior through the linear viscoelasticity theory (Ninomiya and Ferry, 1959).

The third is measuring the stress decay at a constant strain, but for a shorter duration and at a temperature higher than for the field application. The applied strain amplitude can be in the same, non-linear range as in the device, e.g., about 25%. It is preferred that the strain is applied to a stripped coating tube or a cured coating rod rather than a film, in the flexure mode, to avoid the effects of sample imperfection, i.e., 3-point bending, single-, or double-cantilever. Following the general rule of time-temperature equivalence (for every 7–10° C. increase, the time scale is increased by ten fold), the stress response after 24 hours at 77° C. (or 89° C., conservatively estimated with the 10° C. rule) would be equivalent to the stress response after 20 years at 50° C. For this application, it is preferable to measure this stress relaxation behavior after a creep period.

Preferably the inventive coating composition is selected so that in response to a preload comprising the application of a stress of about 80 MPa to the coating at about 80° C. and after a stress-relaxation period of at least about 1 hour, at about 80° C., a residual stress exhibited by the coating comprises at least about 60 MPa. More preferably, the residual stress comprises at least about 64 MPa, even more preferably, at least about 68 MPa, and most preferably at least about 72 MPa. In particular embodiments of the inventive coating, the residual stress comprises at least about 76 MPa or at least about 79 MPa.

Preferably the initial stress maintained on the coating at the end of the creep period and at the beginning of a stress-relaxation period comprises about the same as the stress applied to the coating during the preload, e.g about 80 MPa.

Preferably the stress relaxation period may comprises at least about 1 hour, more preferably at least about 2 hours, even more preferably at least about 3 hours, and most preferably at least about 18 hours.

Figure 16:
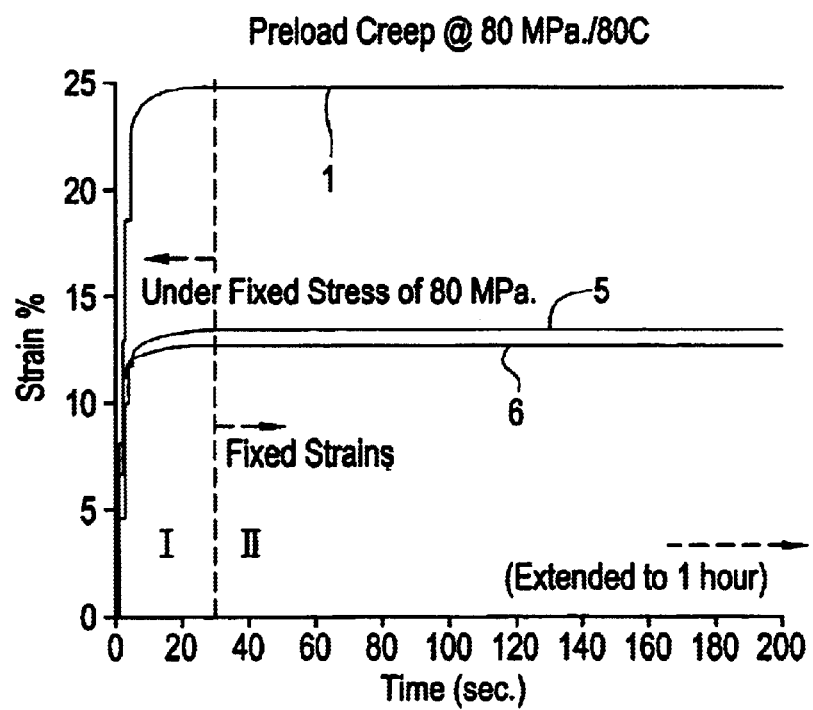
FIG. 16 is a plot of the percent creep strain exhibited by inventive coatings 1, 5, and 6 as a function of time at a temperature of 80° C. and under a static load of 80 MPa.

The term "preload" is used herein to mean at least the condition wherein a stress of a predetermined amplitude is applied to a coating for a sufficient length of time such that and the creep strain (a.k.a. creep) exhibited by the coating reaches a steady state condition. The term "creep period" is used herein to mean a time period, at which the sample is subjected to the preload and the creep reaches a steady-state condition. The term "stress-relaxation" period is used herein to mean a time period at which a constant strain is applied to the sample and relaxation (a.k.a. decay) is measured. The term residual stress is used herein to mean a stress applied to the sample at the end the stress-relaxation period. With respect to FIG. 16, the preload is represented by the region of FIG. 16 which is under a fixed stress of 80 MPa (I) and the stress relaxation period is represented by the region of FIG. 16 which has a fixed strain (II). With respect to the examples below, a stress of about 80 MPa was applied to each coating sample at 80° C. and the percent strain reached a steady state (creep period) in about 40 seconds or less, approximately 30 seconds. The creep period can vary as the temperature at which the strain is applied, e.g if a stress of about 80 MPa was applied to the coating at 60° C., the creep period would be about 3 minutes. Preferably the creep rate at the end of the "preload" comprises less than about 0.03% per second.

In terms of stress-relaxation decay of the stress applied to the fiber, preferably, the residual stress is within about 25% of the initial stress, more preferably within about 15%, and most preferably with about 5%.

Preferably the inventive composition does not exhibit the characteristics of flow. An example of a composition that exhibits flow is a composition that exhibits a stress-relaxation decay of more than about 25% as defined above. In the light of the application of a constant strain on the coating, the stress exhibited by such a coating will continue to substantially decrease after a period of about 1 hour or more, and in light of the application of a constant stress on the coating, such a coating will exhibit a strain that will substantially continue to increase for more than about one hour.

Optionally coating 56 has a Young's modulus of at least about 100 MPa, preferably at least about 600 MPa, more preferably at least about 1000 MPa, and most preferably at least about 1200 MPa. The Young's modulus of coating 56 may be as high as about 2500 to about 2800 MPa. Examples of suitable Young's modulus for coating 56 includes 150 MPa, 300 MPa, 1500 MPa, 2000 MPa, and 2500 MPa. The Young's modulus of coating 56 is determined in accordance with ASTM 882-97. In one embodiment of fiber 50, the outer diameter of coating 56 is about 245 to about 250 μm. Preferably coating 56 is at least about 35 μm thick and more preferably at least about 40 μm. In one preferred embodiment, coating 56 is no more than about 62.5 μm thick. However, the invention is not limited to a particular thickness of coating 56, coating 56 may be thicker than 62.5 μm for particular applications.

Preferably, coating 56 when cured has a Tg of more than about 20° C., more preferably at least about 50° C., and most preferably at least about 70° C. Suitable Tg's also include 90° C. and 100° C. Preferably, the dynamic mechanical analysis is used to determine the Tg at a frequency of about 1 hertz, over a temperature range of about 0° C. to about 250° C., and the temperature is increased at a rate of about 2° C. per minute.

In one example of the inventive coating, the coating will transmit and sustain a lateral load on the order of about 30 to about 60 MPa, in the use temperature range of about 0 to about 70° C., 99% or more of the time when the temperature comprises about 50 to about 55° C., for a period of at least about 10 years, more preferably of at least about 20 years.

Preferred embodiments of coating 56 are listed below in tables A–G.

TABLE A

| Compound | Wt % or pph |
| --- | --- |
| RCC13-572 | 10% |
| Photomer 4028 | 87% |
| Irgacure 1850 | 3% |
| Irganox 1035 | 0.5 pph |
| 3-mercaptopropyltrimethoxy silane | 1.0 pph |

TABLE B

| Compound | Wt % or pph |
| --- | --- |
| RCC 12-892 | 10% |
| SR-355 | 87% |
| Irgacure 819 | 1.5% |
| Irgacure 184 | 1.5% |
| Irganox 1035 | 0.5 pph |

TABLE C

| Compound | Wt % or pph |
| --- | --- |
| Photomer 4028 | 77% |
| Photomer 3016 | 20% |
| Irgacure 184 | 1.5% |
| Irgacure 819 | 1.5% |
| Irganox 1035 | 0.5 pph |

TABLE D

| Compound | Wt % or pph |
| --- | --- |
| Photomer 3016 | 20% |
| SR-444 | 50% |
| SR-355 | 27% |
| Irgacure 819 | 1.5% |
| Irgacure 184 | 1.5% |
| Irganox 1035 | 0.5 pph |

TABLE E

| Compound | Wt % or pph |
| --- | --- |
| Photomer 3016 | 20% |
| SR-444 | 57% |
| Photomer 4028 | 20% |
| Irgacure 819 | 1.5% |
| Irgacure 184 | 1.5% |
| Irganox 1035 | 0.5 pph |

TABLE F

| Compound | Wt % or pph |
| --- | --- |
| Photomer 3016 | 35% |
| SR-444 | 25% |
| Photomer 4072 | 37% |

TABLE F-continued

| Compound | Wt % or pph |
| --- | --- |
| Irgacure 819 | 1.5% |
| Irgacure 184 | 1.5% |
| Irganox 1035 | 0.5 pph |

TABLE G

| Compound | Wt % or pph |
| --- | --- |
| Photomer 3016 | 20% |
| SR-444 | 40% |
| Photomer 4072 | 20% |
| SR-295 | 17% |
| Irgacure 819 | 1.5% |
| Irgacure 184 | 1.5% |
| Irganox 1035 | 0.5 pph |

Preferably coating 56 will transmit stress applied to the coating to fiber 50 to change the refractive index of fiber 50 and transform the polarization of the light transmitted within the fiber. Also preferably, coating 56 has exhibited excellent resistance to mechanical wear, mechanical abrasion, and environmental effects.

Figure 6:
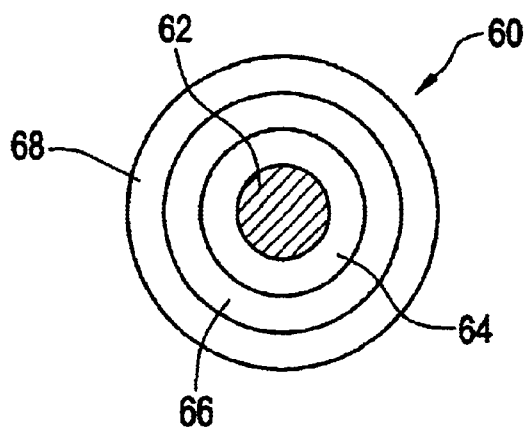
FIG. 6 is a cross sectional view of an optical fiber coated with a dual coating system.

Optionally, segments of optical fiber 50 which are not engaged by the mechanical squeezers may include a dual coating system such as those dual coatings systems commercially available from DSM-Desotech of Elgin, Ill. or Borden Chemical of Columbus, Ohio. Such a dual coating systems is described in U.S. patent application Ser. No. 09/722,895 filed Nov. 27, 2000, the specification of which and its priority documents are incorporated herein by reference. A cross section of a fiber having a dual coating system is shown in FIG. 6. The fiber 60 is coated with a primary coating 66 and secondary coating 68. Each coating 66 and 68 is radiation curable polyurethane coating. Primary coating 66 has a Young's modulus of preferably less than about 10 MPa and is applied to a cladding 64 of fiber 60. Secondary coating 68 has Young's modulus of preferably at least 400 MPa and is applied to primary coating 66.

Figure 7:
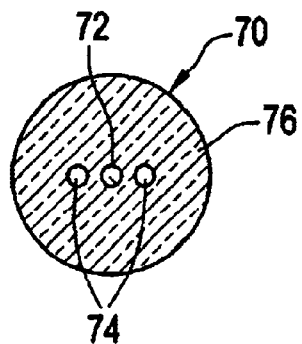
FIGS. 7 and 8 are cross sectional views of the core and cladding of two different types of polarization maintaining fibers.
Figure 8:
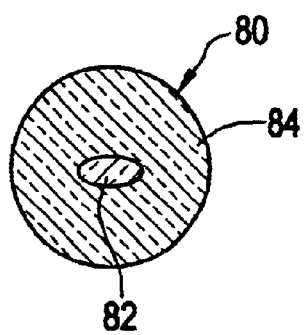

Examples of a polarization maintaining fiber are illustrated in FIGS. 7 and 8. As shown in FIG. 7, fiber 70 is a polarization maintaining fiber. Fiber 70 includes a core 72 and more than one stress rod 74. Core 72 and stress rods 74 are surrounded by cladding 76. For further explanation regarding fiber 70, the specification of U.S. Pat. No. 5,149,349 is incorporated herein by reference with respect to both fiber 70 of FIG. 7 and fiber 80 of FIG. 8. As illustrated in FIG. 8, fiber 80 has an elliptical core 82 surrounded by a cladding 84.

The optical fibers of the present invention can also be formed into an optical fiber ribbon which contains a plurality of substantially aligned, substantially coplanar optic fibers encapsulated by a matrix material. The matrix material can be made of a single layer or of a composite construction. Suitable matrix materials include polyvinyl chloride or other thermoplastic materials as well as those materials known to be useful as secondary coating materials. In one embodiment, the matrix material can be the polymerization product of the composition used to form the secondary coating material.

An embodiment for making the a coated optical fiber in accordance with the invention involves fabricating glass fiber 50, coating the glass fiber with the inventive composition of coating 56 of the present invention, and polymerizing the composition to form the coating 56.

A second embodiment of applying the inventive coating includes applying the coating to a segment of the optical fiber. If the fiber is coated with at least one optical fiber coating, the coating is removed from the segment of the fiber to be coated with the inventive coating 56. The coating may be removed with a fiber coating stripper such as Model OF 103-S from Ripley Company, Miller Tool Division, 46 Nooks Hill Road, Cromwell, Conn. 06415, or Model MS-1-FS from Micro-Electronics, 70 Case Street, Seekonk, Mass. 02271, or Model No-Nik, from Clauss Company, Fremont, Ohio.

Figure 9:
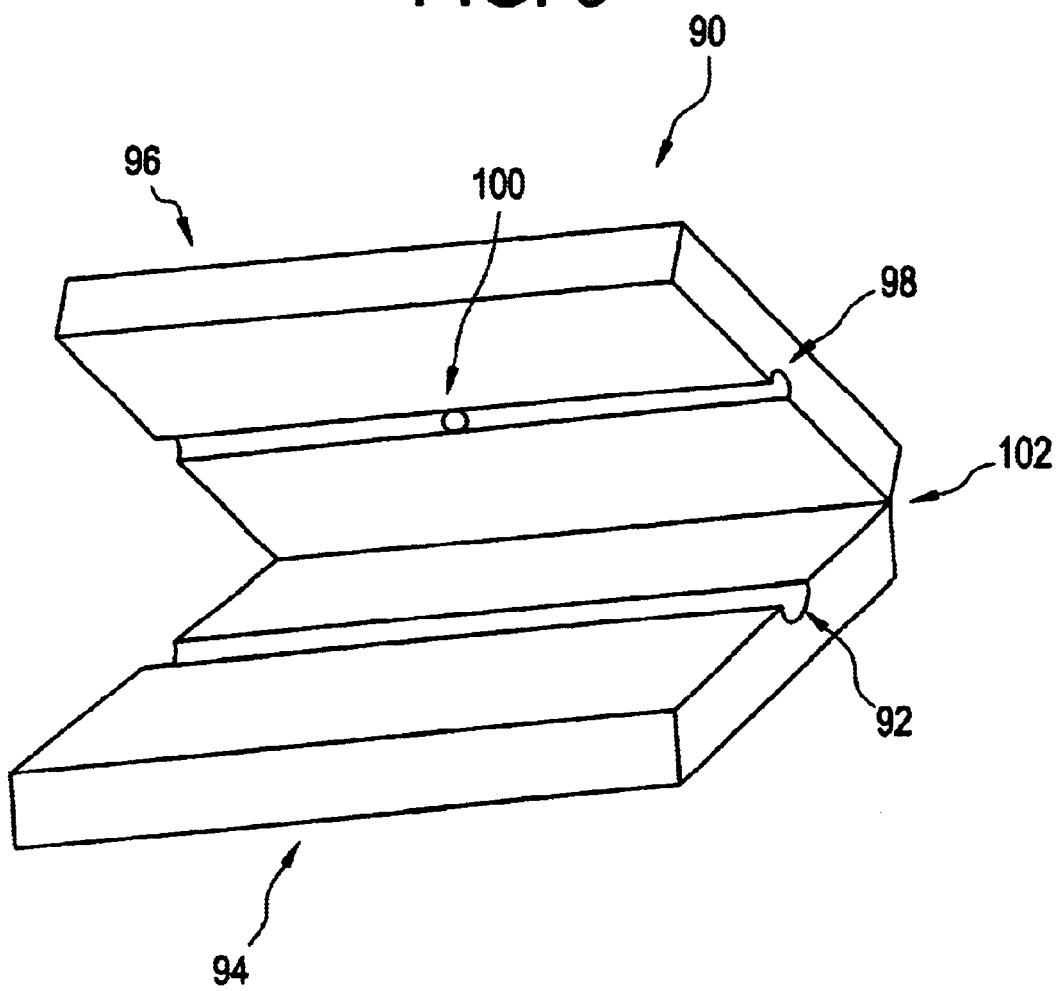
FIG. 9 is a schematic perspective view of an apparatus to coat an uncoated segment of an optical fiber in accordance with the invention.

The inventive coating 56 can be applied to the uncoated segment of the fiber with an apparatus 90 as shown in FIG. 9. Such apparatuses are supplied by, for example, Vytran, 1400 Campus Drive West, Morganville, N.J. 07751 (either their Model PTR-200 Series unit or their FFS-2000 Splice Recoater unit). The uncoated segment of the fiber is placed in a lower fiber groove 92 of a lower die 94. An upper die 96 of apparatus 90 is closed such that upper die 96 comes down around the fiber (not shown) and lower fiber groove 92 and upper fiber groove 98 form a tubular opening containing the uncoated segment of fiber. Preferably, upper die 96 is made from a material that will transmit UV light. The inventive coating 56 is then injected into this tubular opening (92, 98), through an opening 100 in the center of upper die 96 such that the liquid coating surrounds the bare glass and coats the entire bare glass portion of the fiber, filling the tubular opening. Upper die 96 is made such that UV light can be admitted into the tubular opening (92, 98). UV light is then applied through upper die 96 to photopolymerize the injected coating. Once the polymerization is complete, upper die 96 is opened and the coated fiber is removed. Optionally, apparatus 90 includes a hinge 102.

Figure 10:
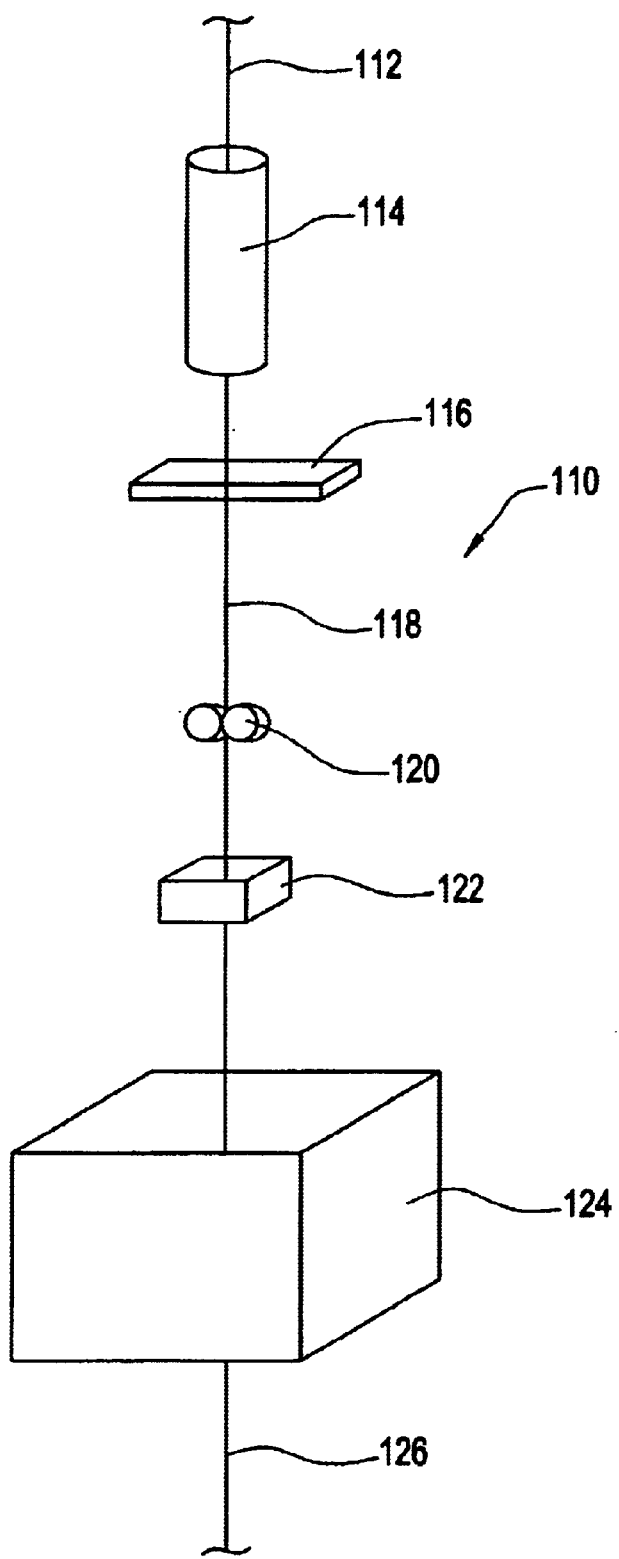
FIG. 10 is a schematic view of a process for coating an optical fiber with the inventive coating in accordance with the invention.

Another embodiment of a method to apply the inventive coating to a fiber is illustrated in FIG. 10 and designated generally by reference numeral 110. A preferred application of this embodiment is to coat a long length of a coated fiber with the inventive coating. A coated fiber 112 (fiber 112 includes at least one coating layer) is passed through a heating element 114. The temperature in heating element 114 is at least about 250° C., preferably at least about 300° C., and more preferably greater than about 350° C. The heated fiber coating is stripped from the fiber as the fiber passes through a stripping element 116. Fiber stripping element 116 can be anyone of the aforementioned fiber coating strippers. The fiber is cleaned by passing through cleaning element 120. An example of a preferred cleaning element is a pair of capstans covered with alcohol-soaked felt pads. A composition of the inventive coating is applied to the fiber in coating die 122. The composition is cured as the fiber passes through an irradiator source 124. Preferably source 124 includes at least one UV lamp. Fiber 126 emerging from source 124 includes the inventive coating 56 in a cured state.

EXAMPLES

The invention will be further clarified by the following examples.

Example 1

Coating Samples

Thirteen coating samples were prepared from the coatings compositions cited above in tables A–G. The test coating compositions are listed below in table 1.

TABLE 1

| Test Coating | Equivalent Coating A–G | Ratio |
|---|---|---|
| 1 | C | N/A |
| 2 | F | N/A |
| 3 | D | N/A |
| 4 | F & C | 50:50 |
| 5 | F & C | 65:35 |
| 6 | F & C | 80:20 |
| 7 | B & C | 60:40 |
| 8 | B & C | 70:30 |
| 9 | E & C | 60:40 |
| 10 | E & C | 70:30 |
| 11 | G & C | 60:40 |
| 12 | C & F | 75:25 |
| 13 | C & G | 75:25 |

N/A: the coating was 100% of the inventive coating and not a mixture of two or more of the listed coatings.

Example 2

Viscoelastic Testing of Inventive Coatings

The viscoelastic testing of the coatings included measurement of Tg and modulus as a function of temperature (Dynamic Mechanical Analyzer hereinafter "DMA"), stress relaxation following a period of creep, and strength (stress-strain curves). Coating samples tested were formed into rods with an external diameter of about 0.62 mm. A Rheometric DMTA-IV (available from Rheometric of Piscataway, N.J.) was used for the below DMA testing. Unless noted otherwise, the frequency was 1 Hz and the temperature was increased at a rate of about 2° C. per minute over a temperature range of about 0° C. to about 250° C.

DMA

Figure 11:
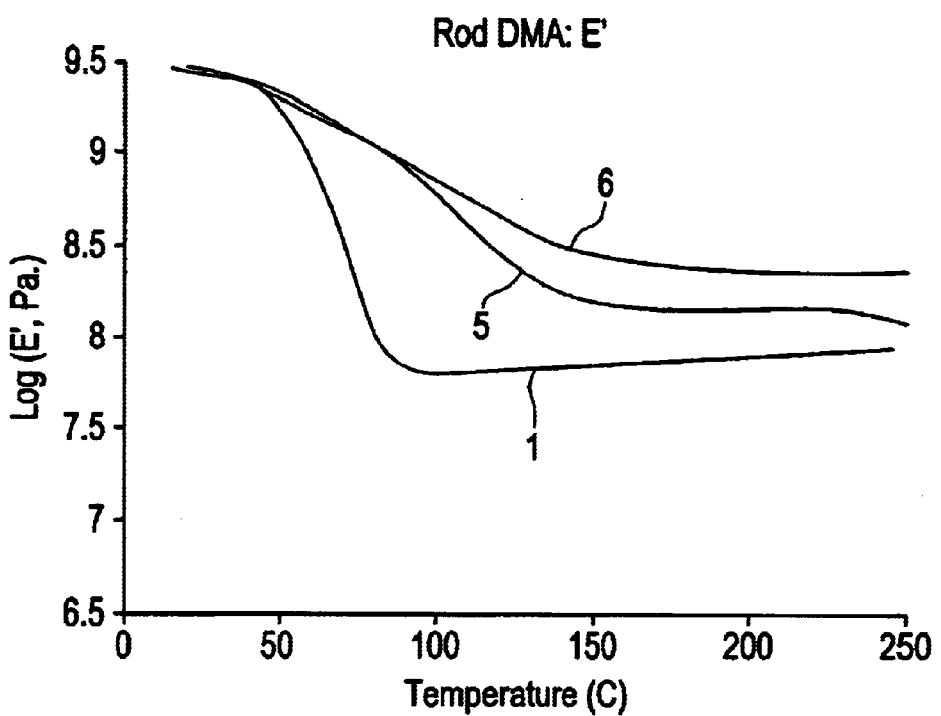
FIG. 11 is a plot of log of the elastic modulus (E') in Pascals vs. temperature for three (1, 5, and 6) of the inventive coatings.
Figure 12:
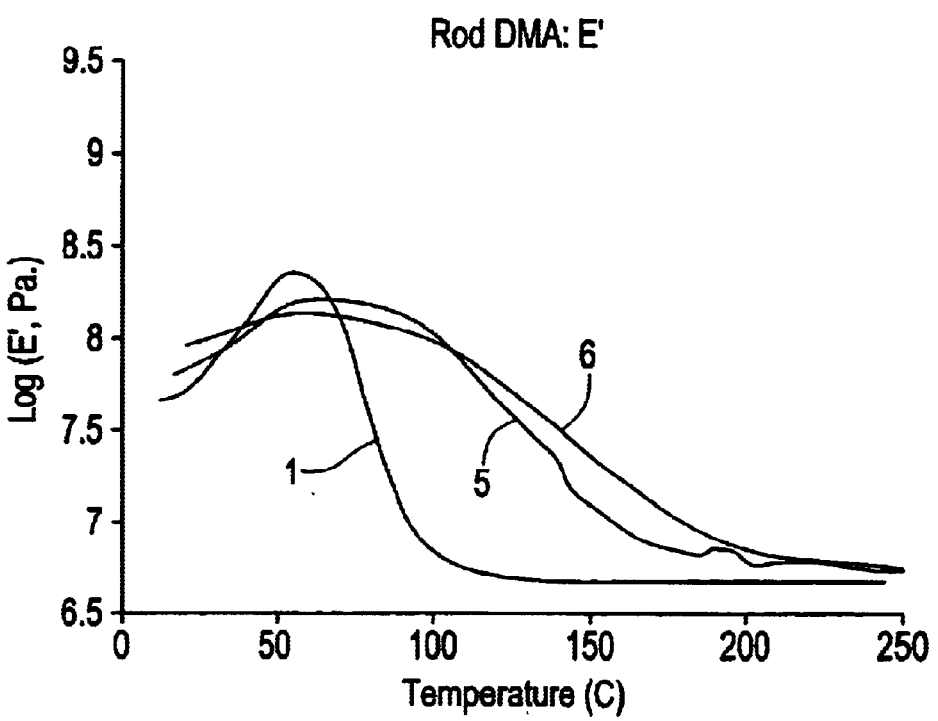
FIG. 12 is a plot of log of the viscous modulus (E") in Pascals vs. temperature for three (1, 5, and 6) of the inventive coatings.
Figure 13:
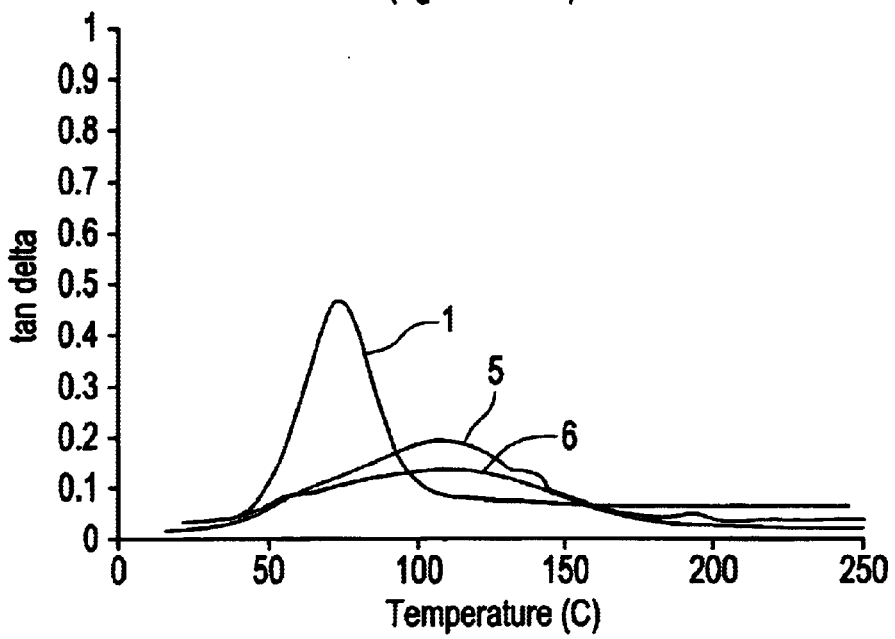
FIG. 13 is a plot of tan delta vs. temperature for three (1, 5, and 6) of the inventive coatings.
Figure 14:
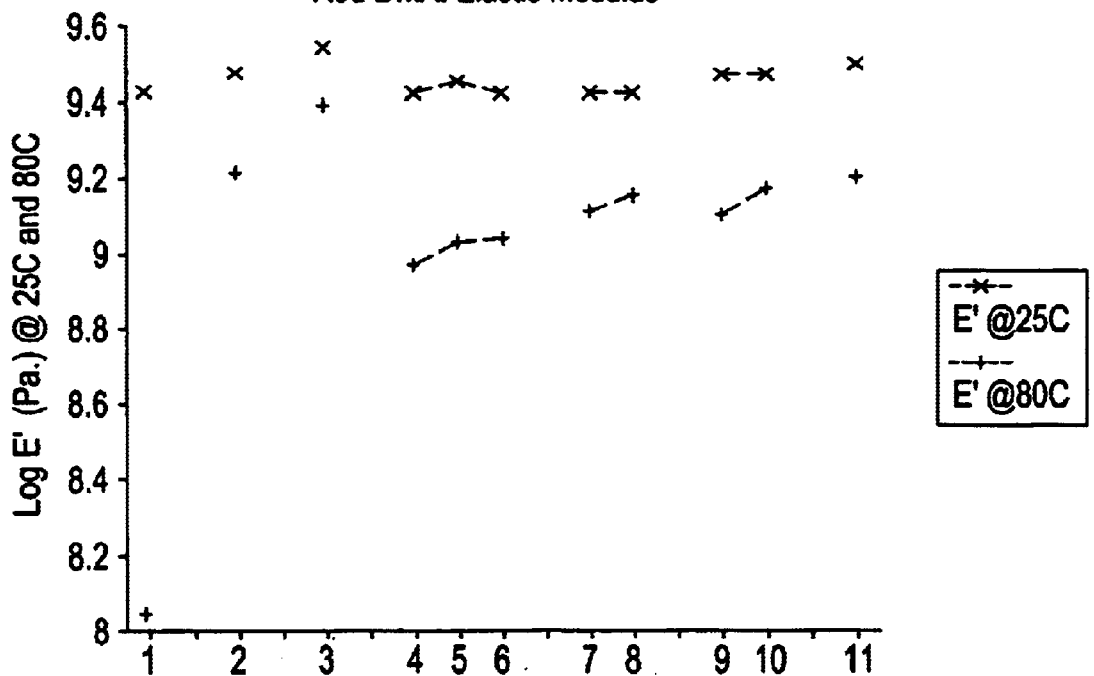
FIG. 14 is a plot of log of the elastic modulus (E') in Pascals at temperatures of 25° C. and 80° C. for the inventive coatings 1–11.
Figure 15:
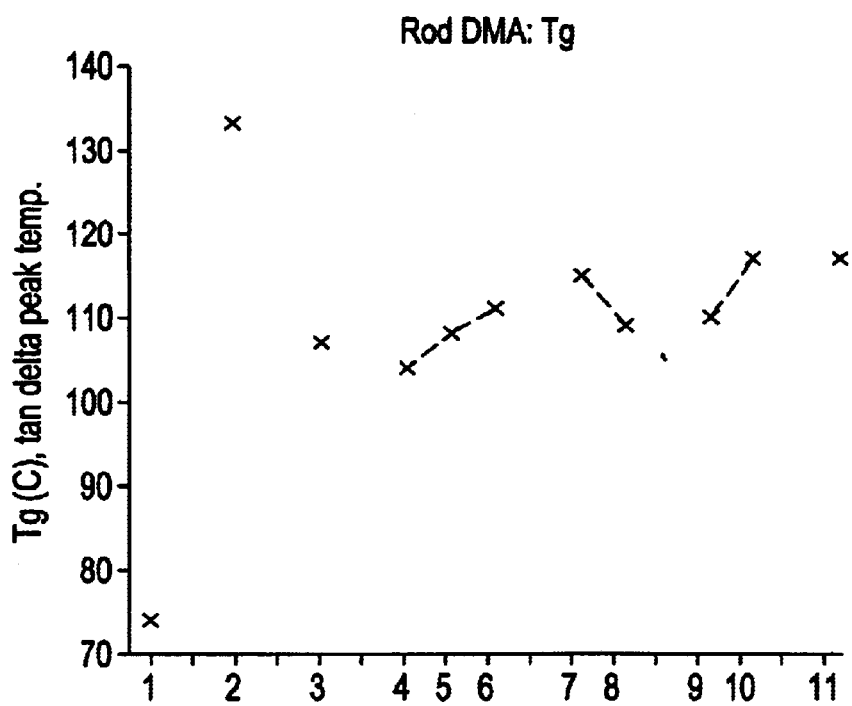
FIG. 15 is a plot of the glass transition temperature for the inventive coatings 1–11.

The glass transition temperature (Tg) is obtained, where the damping factor exhibits a maximum and the rigidity exhibits a drastic change with temperature. Examples of E', E", and damping factor (tan δ) curves are shown in FIGS. 11–13 for inventive coatings 1, 5, and 6. The elastic modulus, E', at 25° C. and 80° C. for formulations 1–11 are illustrated in FIG. 14 and the Tgs (from the peak temperature of the each respective damping factor) for coatings 1–11 are shown in FIG. 15.

Creep+Stress Relaxation @80° C.

Figure 17:
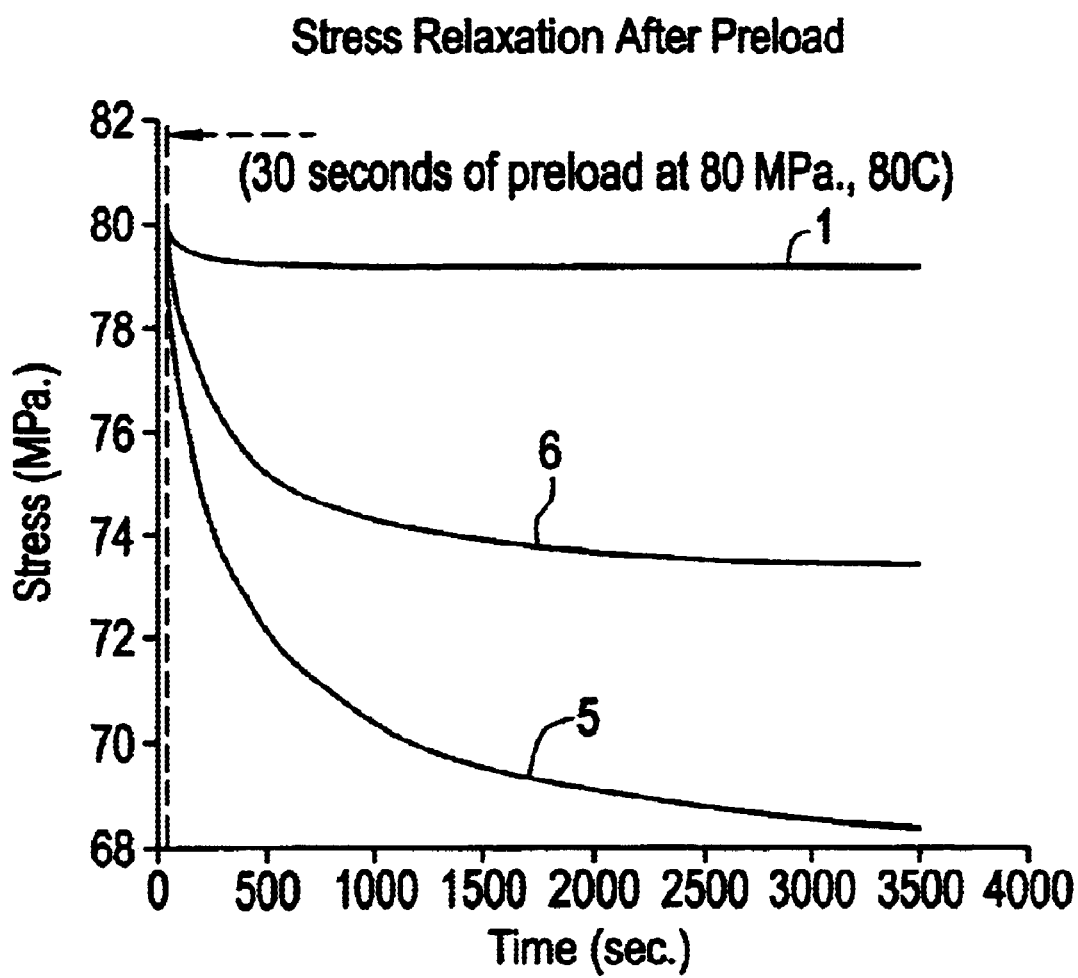
FIG. 17 is a plot of the stress relaxation from a preload of 80 MPa exhibited by inventive coatings 1, 5, and 6 as a function of time following the creep period stated in FIG. 16.

To simulate the stress and strain scenario the coating experiences within a PMDC device, two fundamental test modes were combined sequentially. The coating sample was first put under a constant tensile stress of about 80 MPa. at about 80° C. for about 30 seconds (to simulate the "Preload" step), while the resulting creep strain was monitored. At the end of the creep period, a stress relaxation was started immediately. During the relaxation period, the strain was held constant (as continued from the creep step) while the stress was monitored as it decreased from the initial stress of about 80 MPa. Three examples for the creep and the relaxation experiments are illustrated in FIGS. 16 and 17.

Figure 18:
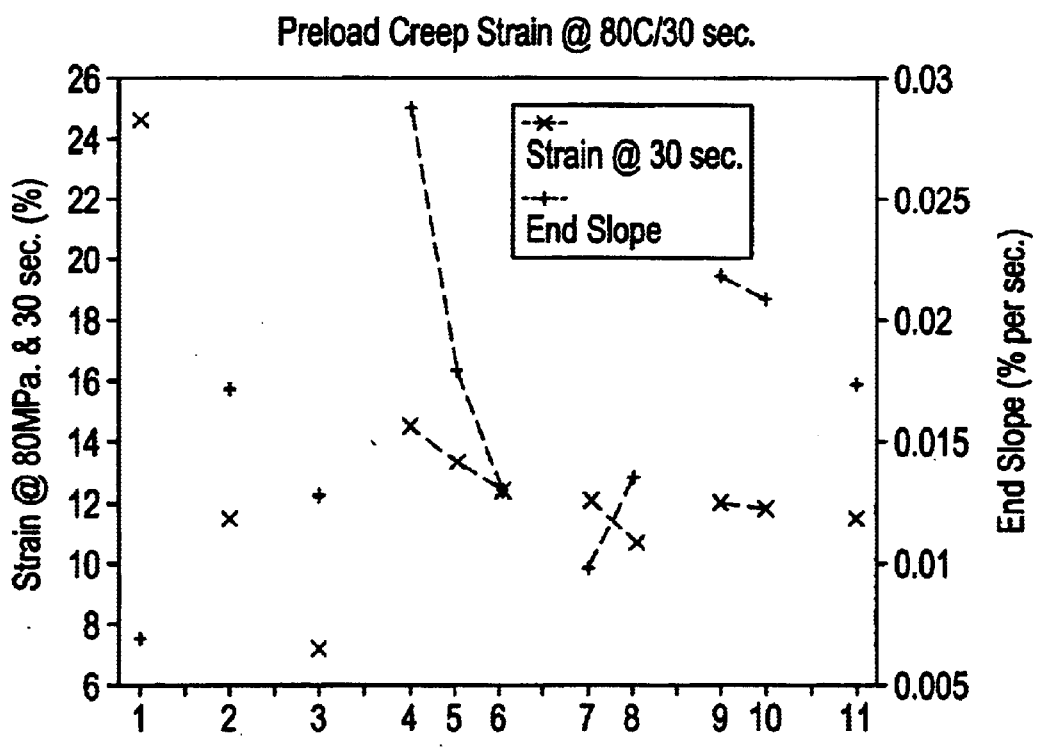
FIG. 18 is a plot of the percent creep strain and the creep rate exhibited by the inventive coatings 1–11 at the end of the creep period

The final strain and the creep rates, i.e., the slope of % strain vs. time at the end of the creep period, for coatings 1–11 were compared in FIG. 18. Coating 1 exhibited the largest strain due to its relative softness @ 80° C., with respect to the testing coatings. However, coating 1 also stabilized the most, i.e., having the lowest creep rate near the end of the 30 second creep period.

Figure 19:
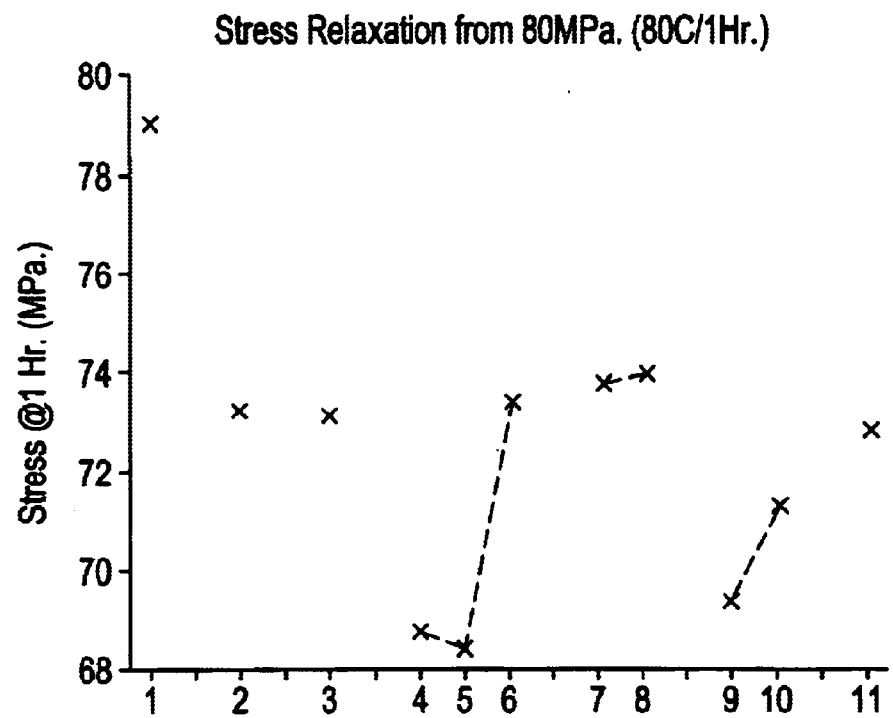
FIG. 19 is a plot of the remaining stress exhibited by the inventive coatings 1–11 after one (1) hour at 80° C., following the creep period.

The final stress at the end of the one-hour stress-relaxation period for coating samples 1–11 were compared in FIG. 19. It can be seen that coating 1 retained the highest stress (79 MPa as compared to about 68 MPa. for coating 5).

Stress-Strain (Strength) @ R.T.

Figure 20:
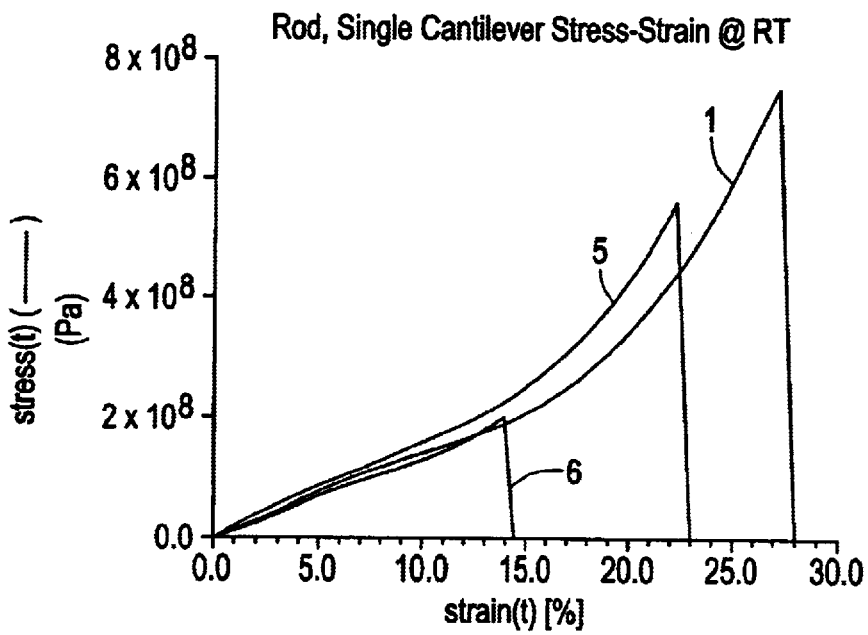
FIG. 20 is plot of the stress vs. percent strain at room temperature of inventive coatings 1, 5, and 6.
Figure 21:
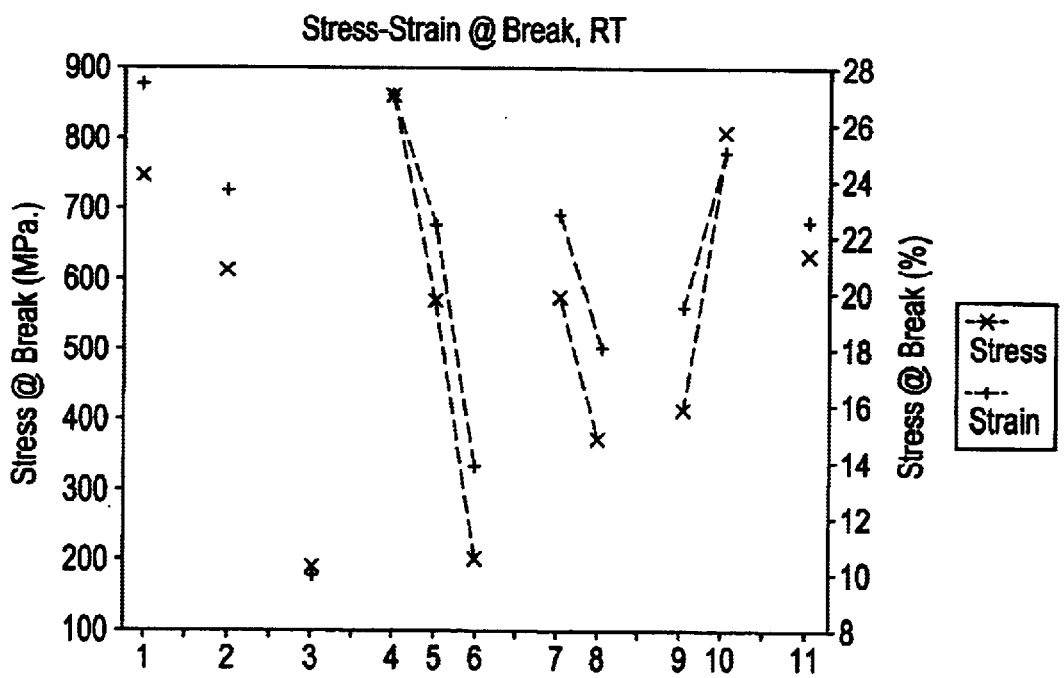
FIG. 21 is a plot of stress and percent strain at break at room temperature of the inventive coatings 1–11.
Figure 22:
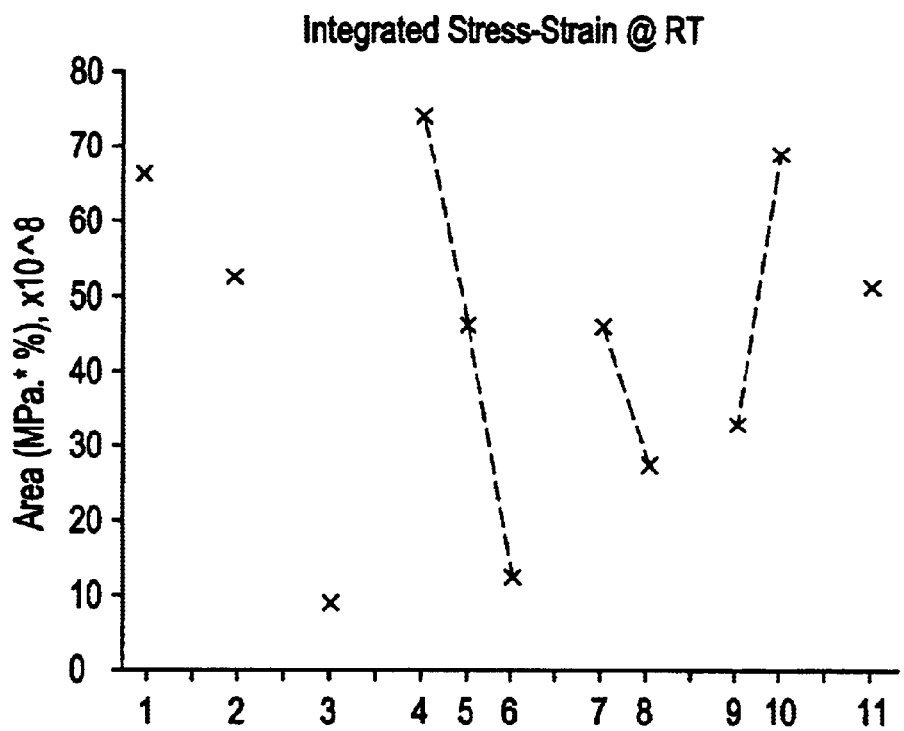
FIG. 22 is an integrated stress-strain plot at room temperature of inventive coatings 1–11.

A relatively rigid coating risks being fractured by handling. The traditional stress-strain test mode was used to compare the ultimate stress and strain at break. Also, fracture energy can be compared by integrating the area under the stress-strain curve. It was seen that coating 1 is among the toughest of all of the inventive coatings. FIG. 20 is a plot of examples of the stress-strain curves for coatings 1, 5, and 6. The ultimate stress and strain, and the relative toughness of coating samples 1–11 as shown in FIGS. 21 and 22 confirm that coating 1 is a tough coating. Coatings 4 and 10 are also particularly tough coatings.

Figure 23:
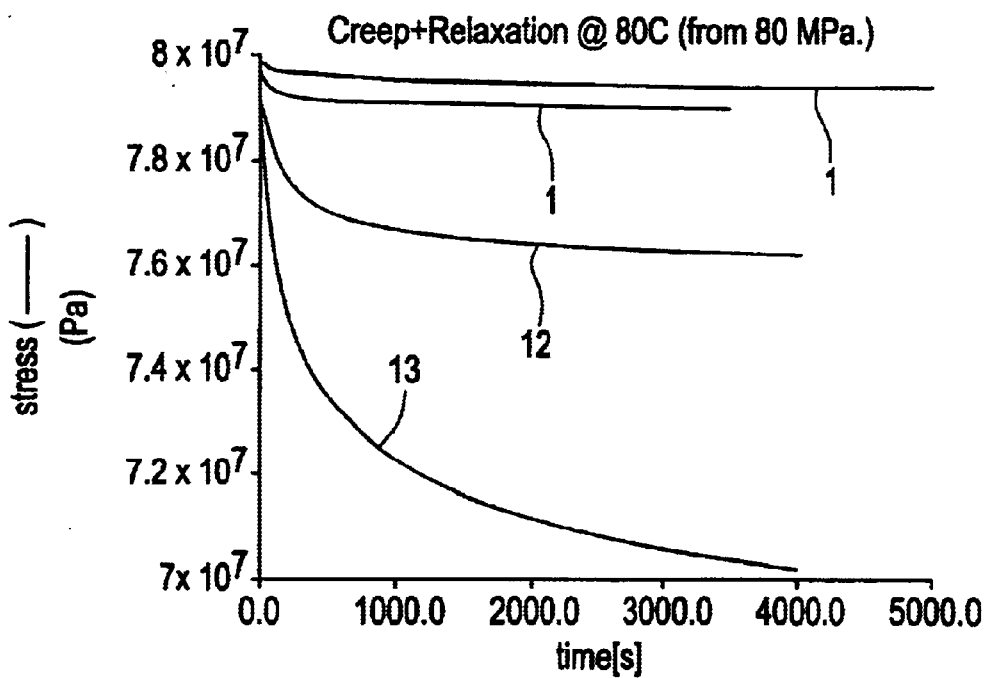
FIG. 23 is plot of stress-relaxation as a function of time of inventive coatings 1, 12, and 13.

FIG. 23 is a stress-relaxation curve of two samples of coating 1 and coatings 12 and 13. As shown in FIG. 23, coating 1 exhibits the very desirable positive aforementioned stress-relaxation property for a period of greater than 1 hour. In fact, coating 1 exhibited the desirable stress-relaxation property for a period of up to at least 18 hours. With respect to coatings 12 and 13, these coatings also exhibited satisfactory stress-relaxation properties over the about 1 hour time period illustrated in FIG. 23.

Three preferable metrology attributes for the inventive coating formulations were studied for PMDC application, under accelerated condition (80° C., 80 MPa.). Data from stress relaxation following creep showed all the coatings to be suitable for maintaining the lateral stress and for coating 1 to be the most suitable. Data from the stress-strain behavior showed coating 1 to be one of the toughest coatings evaluated. The present invention is not limited to the coating 1 in the examples. Any coating which substantially maintains the stress applied to the fiber, as defined by the claims, is a suitable coating.

It will become apparent to those skilled in the art that various modifications to the preferred embodiment of the invention as described herein can be made without departing from the spirit or scope of the invention as defined by the appended claims.

What is claimed is:

1. A coated optical fiber comprising:
    an optical fiber having a core surrounded by a cladding and
    a polymeric coating applied to an outer surface of the cladding of at least a segment of the optical fiber, wherein said polymeric coating is selected so that in response to application of a stress of about 80 MPa to said polymeric coating at about 80° C. followed by a stress-relaxation period of at least about 1 hour at about 80° C., a residual stress exhibited by said polymeric coating is at least about 60 MPa.

2. The fiber according to claim 1 wherein said polymeric coating is the cured reaction produce of a composition comprising about 0–90 weight percent of an oligomeric component and about 5–97 weight percent of a monomeric component, and wherein said polymeric coating has a Young's modulus of at least about 100 MPa.

3. The fiber according to claim 2 wherein said monomeric component comprises at least one ethylenically unsaturated compound.

4. The fiber according to claim 2 wherein said composition is substantially devoid of said oligomeric component and said monomeric component comprises at least about two monomers.

5. The fiber according to claim 1 wherein said residual stress is at least about 68 MPa.

6. The fiber according to claim 2 wherein said composition further comprises no more than about 4.0 pph of a silane containing adhesion promoter.

7. The fiber according to claim 1 wherein said residual stress is at least about 76 MPa.

8. The fiber according to claim 1 wherein a thickness of said polymeric coating is more than about 35 $\mu$m.

9. The fiber according to claim 8 wherein said thickness of said polymeric coating is more than about 62.5 $\mu$m.

10. The fiber according to claim 1 wherein the polymeric coating has a Young's modulus of at least about 100 MPa.

11. The fiber according to claim 10 wherein said Young's modulus is at least about 600 MPa.

12. The fiber according to claim 1 further comprising a dual coating system applied to a second segment of said outer surface of said cladding.

13. The fiber according to claim 1 wherein said optical fiber is a polarization maintaining fiber.

14. The fiber according to claim 1 wherein said polymeric coating has a Tg of at least about 70° C.

15. A polarization mode dispersion compensator for correcting polarization mode dispersion in an optical signal having a fast polarization mode component, a slow polarization mode component and a time differential between the components, the compensator comprising:
    a phase shifter including an input and an output, wherein the input of the phase shifter is coupled to a single mode optical fiber that provides an optical signal that exhibits polarization mode dispersion, the phase shifter functioning to rotate the optical signal principal states of polarization to a desired orientation, the phase shifter further including at least a segment of an optical fiber having a polymeric coating applied to an outer surface thereof, the polymeric coating being selected so that in response to application of a stress of about 80 MPa to said polymeric coating at about 80° C. followed by a stress-relaxation period of at least about 1 hour at about 80° C., a residual stress exhibited by said coating is at least about 60 MPa, said polymeric coating being capable of transmitting a transverse stress to the optical fiber to controllably change the birefringence of the fiber; and
    a variable delay section including an input, an output and at least one optical fiber delay line, wherein the input of the variable delay section is coupled to the output of the phase shifter and the desired orientation of the optical signal principal states of polarization are substantially rotated to be in alignment with one of a fast axis and a slow axis of each of the fiber delay lines, and wherein the variable delay section functions to delay the principal states of polarization of the optical signal with respect to one another as a function of whether the principal states of polarization traverse said one of a fast axis and a slow axis of a given optical fiber delay line thus reducing the time differential between them.

16. The polarization mode dispersion compensator according to claim 15 wherein said polymeric coating is the cured reaction produce of a composition comprising about 0–90 weight percent of an oligomeric component and about 5–97 weight percent of a monomeric component, said polymeric coating having a Young's modulus of at least about 600 MPa.

17. The polarization mode dispersion compensator according to claim 16 wherein said Young's modulus is at least about 1000 MPa.

18. A polarization scrambler for determining whether an optical device exhibits polarization dependent characteristics, the polarization scrambler including an input and an output, the scrambler comprising:
    a first optical fiber having a first end, a second end, a fast axis and a slow axis, wherein the first end of the first optical fiber acts as the input of the polarization scrambler, first optical fiber having a first coating applied to an outer surface thereof, said first coating selected so that in response to application of a stress of about 80 MPa to said first coating at about 80° C. followed by a stress-relaxation period of at least about 1 hour at about 80° C., a residual stress exhibited by said first coating is at least about 60 MPa;

a first mechanical squeezer for applying a mechanical stress to the first optical fiber responsive to a first control signal, the first mechanical squeezer being aligned with the first optical fiber to engage a segment of the first optical fiber;

a second optical fiber having a first end, a second end, a fast axis and a slow axis, wherein the second end of the first optical fiber is coupled to the first end of the second optical fiber at an angle of about forty-five degrees with respect to the polarization axes of the first optical fiber, and wherein the second end of the second optical fiber provides the output of the polarization scrambler; and a second mechanical squeezer for applying a mechanical stress to the second optical fiber responsive to a second control signal.

19. The polarization scrambler according to 18 wherein said first coating is the cured reaction product of a first composition comprising about 0–90 weight percent of an oligomeric component and about 5–97 weight percent of a monomeric component, and wherein said first coating is capable of transmitting a transverse stress to the fiber to controllably change the birefringence of the fiber, and has a Young's modulus of at least about 100 MPa.

20. The polarization scrambler according to claim 18 wherein the second mechanical squeezer is aligned with the second optical fiber to engage a segment of the second optical fiber having a second coating applied to an outer surface thereof, the second coating being the cured reaction product of a second composition comprising about 0–90 weight percent of an oligomeric component and about 5–97 weight percent of a monomeric component, and wherein said second coating is capable of transmitting a transverse stress to the fiber to controllably change the birefringence of the fiber and has a Young's modulus of at least about 100 MPa.

21. The fiber according to claim 1 wherein said Young's modulus is at least about 1000 MPa.

22. A telecommunications link comprising at least one polarization mode dispersion compensator according to claim 15.

23. The telecommunications link comprising at least one polarization scrambler according to claim 18.

24. An optical device comprising:
A coated optical fiber comprising:
an optical fiber having a core surrounded by a cladding, and
a polymeric coating applied to an outer surface of the cladding of at least a segment of the optical fiber, wherein said polymeric coating is selected so that in response to application of a stress of about 80 MPa to said polymeric coating at about 80° C. followed by a stress-relaxation period of at least about 1 hour at about 80° C., a residual stress exhibited by said polymeric coating is at least about 60 MPa; and
a mechanical squeezer aligned with the optical fiber to engage the segment of the optical fiber.

25. The device according to claim 24 wherein said residual stress is at least about 76 MPa.

26. The device according to claim 24 wherein the polymeric coating has a Young's modulus of at least about 100 MPa.

* * * * *